(12) United States Patent
Li

(10) Patent No.: US 12,277,324 B2
(45) Date of Patent: Apr. 15, 2025

(54) MEMORY SYSTEM, OPERATION METHOD THEREOF, AND COMPUTER-READABLE STORAGE MEDIUM FOR SORTING SUPER BLOCKS

(71) Applicant: YANGTZE MEMORY TECHNOLOGIES CO., LTD., Wuhan (CN)

(72) Inventor: Jing Li, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/229,706

(22) Filed: Aug. 3, 2023

(65) Prior Publication Data

US 2024/0377959 A1 Nov. 14, 2024

Related U.S. Application Data

(63) Continuation of application No. PCT/CN2023/093036, filed on May 9, 2023.

(51) Int. Cl.
  *G06F 3/06* (2006.01)
(52) U.S. Cl.
  CPC ............ *G06F 3/0616* (2013.01); *G06F 3/064* (2013.01); *G06F 3/0679* (2013.01)
(58) Field of Classification Search
  CPC ....... G06F 3/0616; G06F 3/064; G06F 3/0679
  See application file for complete search history.

(56) References Cited

U.S. PATENT DOCUMENTS

| | | | |
|---|---|---|---|
| 2016/0125956 A1* | 5/2016 | Magia | G11C 29/52 714/719 |
| 2017/0286288 A1* | 10/2017 | Higgins | G06F 12/0246 |
| 2019/0236020 A1* | 8/2019 | Jang | G06F 12/1009 |
| 2019/0294335 A1* | 9/2019 | Kim | G06F 3/061 |
| 2019/0369908 A1* | 12/2019 | Koo | G06F 3/0659 |
| 2020/0110545 A1* | 4/2020 | Choi | G06F 3/0679 |
| 2021/0026547 A1* | 1/2021 | Peh | G06F 3/0604 |
| 2021/0103394 A1* | 4/2021 | Rho | G06F 3/0616 |
| 2021/0365200 A1* | 11/2021 | Alwala | G06F 3/0604 |

FOREIGN PATENT DOCUMENTS

CN 110825319 A 2/2020

\* cited by examiner

*Primary Examiner* — Tasnima Matin
(74) *Attorney, Agent, or Firm* — BAYES PLLC

(57) ABSTRACT

Implementations of the present disclosure provide a memory system, an operation method thereof, and a computer-readable storage medium. The memory system includes at least one non-volatile storage device and a controller coupled to the non-volatile storage device, where each of the non-volatile storage devices includes a plurality of blocks, and at least one block in at least one of the non-volatile storage devices constitutes a super block. The controller may be configured to determine sorting of a plurality of super blocks based on an erase count of each super block and a number of bad blocks in each super block. The erase counts of any two adjacent super blocks in the sorting may meet a preset requirement, first super blocks in the sorting may be arranged at intervals, and a number of bad blocks in the first super block may be greater than a preset value.

20 Claims, 6 Drawing Sheets

MEMORY SYSTEM, OPERATION METHOD THEREOF, AND COMPUTER-READABLE STORAGE MEDIUM FOR SORTING SUPER BLOCKS

CROSS-REFERENCE TO RELATED APPLICATIONS

This application is a continuation of International Application No. PCT/CN2023/093036, filed on May 9, 2023, which is incorporated herein by reference in its entirety.

TECHNICAL FIELD

The present disclosure relates to the technical field of semiconductors, and in particular, to a memory system, an operation method thereof, and a computer-readable storage medium.

BACKGROUND

A memory system, for example, a Solid-State Drive (SSD), may use a flash memory (Flash), a Dynamic Random Access Memory (DRAM), or a Three-Dimensional Magnetic Memory (3D XPoint) as a storage medium. A Flash Translation Layer (FTL) can complete the mapping of the Logical Block Address (LBA) of the host to the Physics Block Address (PBA) of the flash memory. In other words, FTL needs a mapping table from LBA to PBA. In the entire read and write processes of the SSD, it is desired to search and update this mapping table in real time, so that data can be correctly read or written. Therefore, the quality of the FTL algorithm directly determines the quality of the memory system (e.g., SSD) in terms of performance, reliability, endurance, etc.

SUMMARY

Implementations of the present disclosure provide a memory system, an operation method thereof, and a computer-readable storage medium.

In a first aspect, an implementation of the present disclosure provides a memory system including at least one non-volatile storage device and a controller coupled to the non-volatile storage device. Each of the non-volatile storage devices may include a plurality of blocks. At least one block in at least one of the non-volatile storage devices may constitute a super block. The controller may be configured to determine sorting of a plurality of super blocks based on an erase count of each super block and a number of bad blocks in each super block. The erase counts of any two adjacent super blocks in the sorting may meet a preset requirement. First super blocks in the sorting may be arranged at intervals. A number of bad blocks in the first super block may be greater than a preset value. The controller may be configured to determine a priority of write operations on the plurality of super blocks based on the sorting of the plurality of super blocks.

In some implementations, the higher a rank of the super block in the sorting, the higher the priority of write operations on the super block by the controller. In some implementations, the erase count of the super block that is ranked higher in any two adjacent super blocks in the sorting may be less than or equal to the erase count of the super block that is ranked lower. In some implementations, the erase count of the super block that is ranked higher in any two adjacent super blocks in the sorting may be greater than an erase count of the super block that is ranked lower. In some implementations, a difference between the erase counts of two super blocks may be less than a preset difference.

In some implementations, the higher the rank of the super block in the sorting, the lower the priority of write operations on the super block by the controller. In some implementations, the erase count of the super block that is ranked higher in any two adjacent super blocks in the sorting may be greater than or equal to the erase count of the super block that is ranked lower. In some implementations, the erase count of the super block that is ranked higher in any two adjacent super blocks in the sorting may be less than an erase count of the super block that is ranked lower. In some implementations, the difference between the erase counts of the two super blocks is less than the preset difference.

In some implementations, the controller may be configured to determine a pre-sorting of the plurality of super blocks based on the erase count of each super block. In some implementations, the plurality of super blocks in the pre-sorting may be sequentially arranged in an ascending order or a descending order based on the erase count.

In some implementations, the controller may be configured to determine at least two adjacently arranged first super blocks based on the pre-sorting of the plurality of super blocks, In some implementations, the controller may be configured to adjust an order or a position of the first super block based on the number of bad blocks in the first super block to determine a first sub-sorting of the plurality of super blocks. In some implementations, the erase counts of any two adjacent super blocks in the first sub-sorting may meet the preset requirements. In some implementations, the first super blocks in the first sub-sorting may not be adjacently arranged.

In some implementations, the plurality of super blocks may further include a second super block and a third super block. In some implementations, the number of the bad blocks in the second super block may be greater than zero and less than or equal to a preset value. In some implementations, the number of the bad blocks in the third super block may be equal to zero. In some implementations, the first super block and the second super block in the first sub-sorting may be adjacently arranged. In some implementations, the first super block and the third super block in the first sub-sorting may be adjacently arranged.

In some implementations, the controller may be configured to determine the first super block and the second super block that are adjacently arranged based on the first sub-sorting of the plurality of super blocks. In some implementations, the controller may be configured to adjust the order or position of the first super block and the second super block based on the numbers of bad blocks in the first super block and the second super block to determine a second sub-sorting of the plurality of super blocks. In some implementations, the erase counts of any two adjacent super blocks in the second sub-sorting may meet a preset requirement, in some implementations, the first super block and the second super block in the second sub-sorting may not be adjacently arranged.

In some implementations, two second super blocks in the second sub-sorting may be adjacently arranged. In some implementations, the first super block and the third super block in the second sub-sorting may be adjacently arranged. In some implementations, the second super block and the third super block in the second sub-sorting may be adjacently arranged.

In some implementations, the controller may be configured to determine at least two adjacently arranged second super blocks based on the second sub-sorting of the plurality of super blocks. In some implementations, the controller may be configured to adjust the order or position of the second super block based on the number of bad blocks in the second super block to determine the sorting of the plurality of super blocks. In some implementations, the second super blocks in the sorting may not be adjacently arranged.

In some implementations, the second super block and the third super block in the sorting may be adjacently arranged.

In some implementations, the super blocks may include free blocks.

In a second aspect, an implementation of the present disclosure provides an method for operating a memory system. The memory system may include at least one non-volatile storage device and a controller coupled to the non-volatile storage device. Each of the non-volatile storage devices may include a plurality of blocks. At least one block in at least one of the non-volatile storage devices may constitute a super block. The method may include determining, by the controller, sorting of a plurality of super blocks based on an erase count of each super block and a number of bad blocks in each super block. The erase counts of any two adjacent super blocks in the sorting may meet a preset requirement. First super blocks in the sorting may be arranged at intervals. A number of bad blocks in the first super block may be greater than a preset value. The method may include determining a priority of write operations on the plurality of super blocks based on the sorting of the plurality of super blocks.

In some implementations, the higher a rank of the super block in the sorting, the higher the priority of write operations on the super block by the controller. In some implementations, the erase count of the super block that is ranked higher in any two adjacent super blocks in the sorting may be less than or equal to the erase count of the super block that is ranked lower. In some implementations, the erase count of the super block that is ranked higher in any two adjacent super blocks in the sorting may be greater than an erase count of the super block that is ranked lower. In some implementations, a difference between the erase counts of two super blocks may be less than a preset difference.

In some implementations, the higher the rank of the super block in the sorting, the lower the priority of write operations on the super block by the controller. In some implementations, the erase count of the super block that is ranked higher in any two adjacent super blocks in the sorting may be greater than or equal to the erase count of the super block that is ranked lower. In some implementations, the erase count of the super block that is ranked higher in any two adjacent super blocks in the sorting may be less than an erase count of the super block that is ranked lower. In some implementations, the difference between the erase counts of the two super blocks is less than the preset difference.

In some implementations, before the determining sorting of a plurality of super blocks based on an erase count of each super block and a number of bad blocks in each super block, the method may include determining a pre-sorting of the plurality of super blocks based on the erase count of each super block. In some implementations, the plurality of super blocks in the pre-sorting may be sequentially arranged in an ascending order or a descending order based on the erase count.

In some implementations, after the determining a pre-sorting of the plurality of super blocks based on the erase count of each super block, the method may include determining at least two adjacently arranged first super blocks based on the pre-sorting of the plurality of super blocks. In some implementations, after the determining a pre-sorting of the plurality of super blocks based on the erase count of each super block, the method may include adjusting an order or a position of the first super block based on the number of bad blocks in the first super block to determine a first sub-sorting of the plurality of super blocks. In some implementations, the erase counts of any two adjacent super blocks in the first sub-sorting may meet the preset requirements. In some implementations, the first super blocks in the first sub-sorting may not be adjacently arranged.

In some implementations, the plurality of super blocks may further include a second super block and a third super block. In some implementations, the number of the bad blocks in the second super block may be greater than zero and less than or equal to a preset value, and the number of the bad blocks in the third super block is equal to zero. In some implementations, the first super block and the second super block in the first sub-sorting may be adjacently arranged. In some implementations, the first super block and the third super block in the first sub-sorting may be adjacently arranged.

In some implementations, after adjusting an order or a position of the first super block based on the number of bad blocks in the first super block to determine a first sub-sorting of the plurality of super blocks, the method may include determining the first super block and the second super block that are adjacently arranged based on the first sub-sorting of the plurality of super blocks. In some implementations, after adjusting an order or a position of the first super block based on the number of bad blocks in the first super block to determine a first sub-sorting of the plurality of super blocks, the method may include adjusting the order or position of the first super block and the second super block based on the numbers of bad blocks in the first super block and the second super block to determine a second sub-sorting of the plurality of super blocks. In some implementations, the erase counts of any two adjacent super blocks in the second sub-sorting may meet a preset requirement In some implementations, the first super block and the second super block in the second sub-sorting may not be adjacently arranged.

In some implementations, two second super blocks in the second sub-sorting may be adjacently arranged. In some implementations, the first super block and the third super block in the second sub-sorting may be adjacently arranged. In some implementations, the second super block and the third super block in the second sub-sorting may be adjacently arranged.

In some implementations, after adjusting the order or position of the first super block and the second super block based on the numbers of bad blocks in the first super block and the second super block to determine a second sub-sorting of the plurality of super blocks, the method may further include determining at least two adjacently arranged second super blocks based on the second sub-sorting of the plurality of super blocks. In some implementations, after adjusting the order or position of the first super block and the second super block based on the numbers of bad blocks in the first super block and the second super block to determine a second sub-sorting of the plurality of super blocks, the method may further include adjusting the order or position of the second super block based on the number of bad blocks in the second super block to determine the sorting of the plurality of super blocks, wherein the second super blocks in the sorting are not adjacently arranged.

In some implementations, the second super block and the third super block in the sorting may be adjacently arranged.

In some implementations, the super blocks may include free blocks.

In a third aspect, an implementation of the present disclosure provides a computer-readable storage medium storing a computer program which, when executed, may implement the method for operating the memory system as described in the above technical solution.

Implementations of the present disclosure provide a memory system, an operation method thereof, and a computer-readable storage medium. In the implementation of the present disclosure, both the erase count of the super block and the number of bad blocks in the super block are considered to determine the priority of the write operation to the super block, which can effectively smooth the write performance and enhance the performance stability of the memory system.

DETAILED DESCRIPTION

Figure 1:
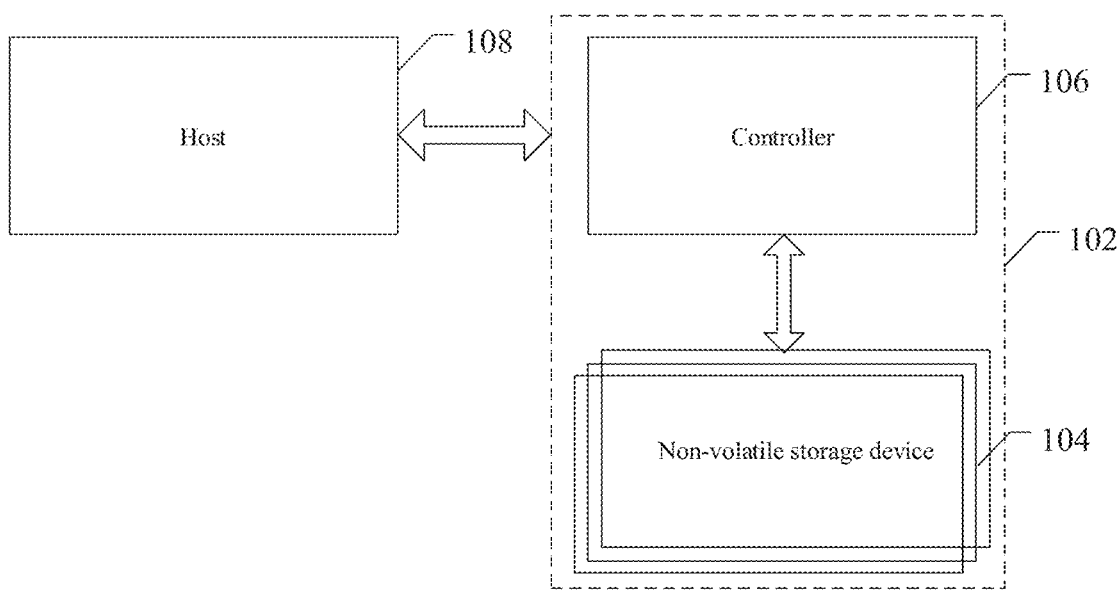
FIG. 1 is a block diagram of a system with a non-volatile storage device, according to an implementation of the present disclosure.

The technical solutions in the implementations of the present disclosure will be clearly and completely described below in conjunction with the implementations of the present disclosure and the accompanying drawings. Obviously, the described implementations are only part of the implementations of the present disclosure, but not all of them. Based on the implementations in the present disclosure, all other implementations obtained by persons of ordinary skill in the art without creative efforts fall within the protection scope of the present disclosure.

In the following description, numerous specific details are given in order to provide a more thorough understanding of the present disclosure. It will be apparent, however, to one skilled in the art that the present disclosure may be practiced without one or more of these details. In other instances, some technical features well known in the art are not described to avoid confusion with the present disclosure. That is, not all features of actual implementations are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" another element or layer, it can be directly on, adjacent to, connected to, or coupled to other elements or layers, or intervening elements or layers may be present. In contrast, when an element is referred to as being "directly on," "directly adjacent to," "directly connected to" or "directly coupled to" another element or layer, there are no intervening elements or layers present. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure. When a second element, component, region, layer or section is discussed, it does not indicate that a first element, component, region, layer or section is necessarily present in the present disclosure.

Spatial terms such as "under", "below", "beneath", "underneath", "on", "above" and so on, can be used here for convenience to describe the relationship of one element or feature to other elements or features shown in the figures. It will be understood that the spatially relative terms are intended to encompass different orientations of the device in use and operation in addition to the orientation depicted in the figures. For example, if the device in the figures is turned over, elements or features described as "below" or "under" or "beneath" other elements or features would then be oriented "above" the other elements or features. Thus, the exemplary terms "below" and "beneath" can encompass both orientations of above and below. The device may be otherwise oriented (rotated 90 degrees or at other orientations) and the spatial descriptors used herein may be interpreted accordingly.

The terminology used herein is for the purpose of describing particular implementations only and is not to be taken as a limitation of the present disclosure. As used herein, the singular forms "a", "an" and "said/the" are intended to include the plural forms as well, unless the context clearly dictates otherwise. It should also be understood that the terms "consists of" and/or "comprising", when used in this specification, identify the presence of stated features, integers, steps, operations, elements and/or parts, but do not exclude presence or addition of one or more other features, integers, steps, operations, elements, parts and/or groups. As used herein, the term "and/or" includes any and all combinations of the associated listed items.

To explain the technical solution of the present disclosure, detailed steps and detailed structures will be provided in the following description. Preferred implementations of the present disclosure are described in detail below. However, the present disclosure may have other implementations besides these detailed descriptions.

The non-volatile storage device in the implementations of the present disclosure includes, but is not limited to, a three-dimensional NAND non-volatile storage device. For ease of understanding, a three-dimensional NAND non-volatile storage device is used as an example for illustration.

Reasonable planning and use of storage devices in a memory system can optimize the FTL algorithm, which is very important for realizing high performance, low power consumption, etc. of the memory system (e.g., SSD). Unqualified management of storage devices in the memory system may cause undesirable performance fluctuations. To overcome these and other challenges, the present disclosure provides various solutions Referring to FIG. 1, a block diagram of a system with a non-volatile storage device is depicted. As shown in FIG. 1, the non-volatile storage device may include system 100. System 100 may include, e.g., a mobile phone, desktop computer, laptop computer, tablet computer, vehicle computer, game console, printer, pointing device, wearable electronic device, smart sensor, virtual reality (VR) device, augmented reality (AR) device, or any other suitable electronic device having non-volatile storage device therein.

As shown in FIG. 1, the system 100 may include a host 108 and a memory system 102. The memory system 102 may include one or more non-volatile storage devices 104 and a controller 106. The host 108 may be a processor (e.g., a Central Processing Unit (CPU)) or a System-on-Chip (SoC) (e.g., an Application Processor (AP)) of an electronic device. Host 108 may be configured to send data to or receive data from the non-volatile storage device 104.

In some implementations, the controller 106 is coupled to the non-volatile storage device 104 and host 108 and is configured to control the non-volatile storage device 104. Controller 106 may manage data stored in the non-volatile storage device 104 and communicate with host 108.

In some implementations, the controller 106 is designed to operate in low duty-cycle environments, e.g., such as Secure Digital (SD) cards, Compact Flash (CF) cards, Universal Serial Bus (USB) flash drives, or other media for use in electronic devices (e.g., personal computers, digital cameras, mobile phones, and the like).

In some implementations, the controller 106 is designed for operation in a high duty-cycle environment SSD or embedded Multi-Media Card (eMMC) used as data storage for mobile devices such as a smartphone, tablet computer, laptop computer, etc., and enterprise memory arrays.

In some implementations, the controller 106 is designed to operate in a high duty cycle environment SSD or embedded Multi-Media Card (eMMC) used as a device such as a smartphone, tablet computer. Data storage for mobile devices such as laptops and enterprise storage arrays.

The controller 106 may be configured to control operations of the non-volatile storage device 104, such as read, erase and program operations. The controller 106 may further be configured to manage various functions related to data stored or to be stored in the non-volatile storage device 104. These functions may include, but are not limited to, bad block management, garbage collection, logical-to-physical address translation, wear leveling, and the like. In some implementations, controller 106 is further configured to process Error Correction Code (ECC) on data read from or written to the non-volatile storage device 104.

Controller 106 may further perform any other suitable functions, e.g., such as formatting the non-volatile storage device 104. Controller 106 may communicate with external devices (e.g., host 108) according to various communication protocols. For example, the controller 106 can communicate with external devices through at least one of various interface protocols. These interface protocols may include, e.g., a USB protocol, an MMC protocol, a Peripheral Component Interconnect (PCI) protocol, a PCI Express (PCI-E) protocol, an Advanced Technology Attachment (ATA) protocol, a Serial ATA protocol, a Parallel ATA protocol, a Small Computer Small Interface (SCSI) protocol, an Enhanced Small Drive Interface (ESDI) protocol, an Integrated Drive Electronics (IDE) protocol, an Firewire protocol, etc.

The controller 106 and one or more non-volatile storage devices 104 may be integrated into various types of storage devices, which may be included in the same package (e.g., a Universal Flash storage (UFS) package or an eMMC package). That is, the memory system 102 can be implemented and packaged into different types of end electronic products.

Figure 2A:
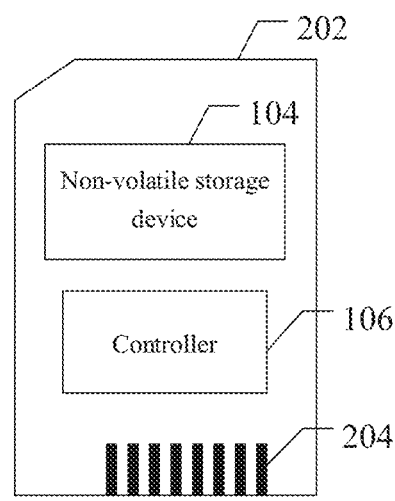
FIG. 2A is a schematic diagram of a memory card with a non-volatile storage device, according to an implementation of the present disclosure.

Referring to FIG. 2A, a schematic diagram of a memory card with a non-volatile storage device is depicted. As shown in FIG. 2A, the controller 106 and a single non-volatile storage device 104 may be integrated into a memory card 202. The memory card 202 may include, e.g., a Personal Computer Memory Card International Association (PCMCIA) card, a CF card, a Smart Media (SM) card, a memory stick, a Multi-Media Card (MMC) (e.g., a Reduced-Size MMC (RS-MMC), a Micro MMC (MMCmicro)), an SD (e.g., miniSD, microSD, a Secure Digital High Capacity (SDHC)) card, a UFS, and the like The memory card 202 may further include a memory card connector 204 that couples the memory card 202 to a host (e.g., host 108 in FIG. 1).

Figure 2B:
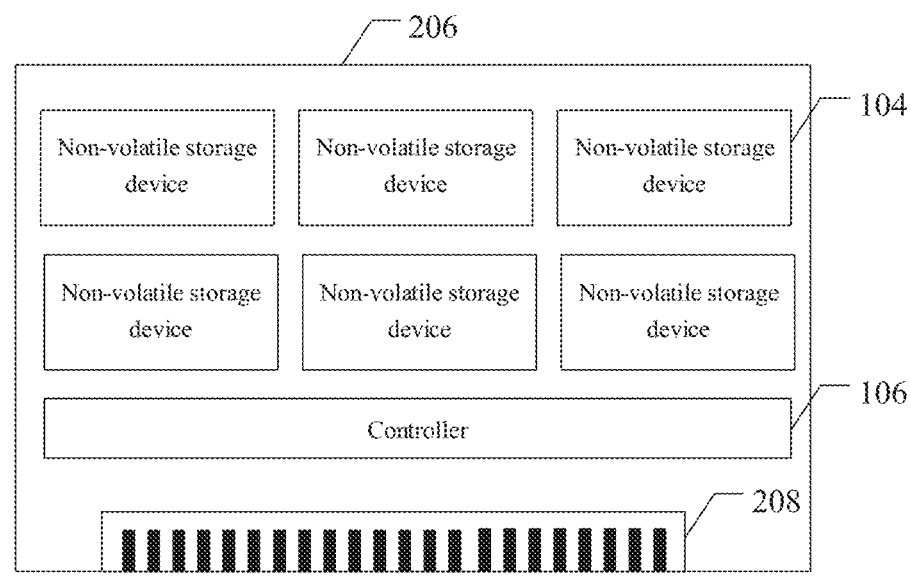
FIG. 2B is a schematic diagram of a solid-state drive with a non-volatile storage device, according to an implementation of the present disclosure.

Referring to FIG. 2B, a schematic diagram of a solid-state drive with a non-volatile storage device is depicted. As shown in FIG. 2B. the controller 106 and the plurality of non-volatile storage devices 104 may be integrated into a solid state drive 206. Solid state drive 206 may further include solid state drive connector 208 that couples solid state drive 206 to a host (e.g., host 108 in FIG. 1). In some implementations, the storage capacity and/or operating speed of solid state drive 206 may be greater than the storage capacity and/or operating speed of memory card 202.

Figure 3:
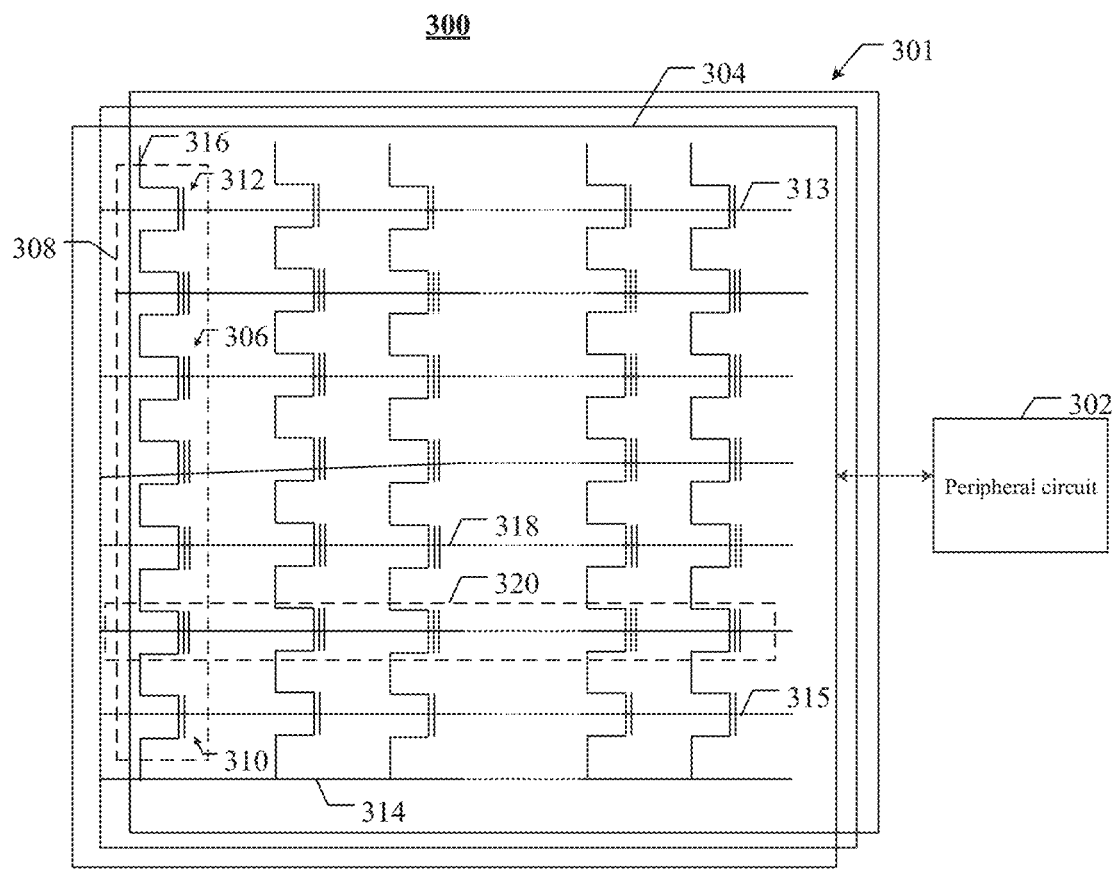
FIG. 3 is a schematic diagram of a non-volatile storage device including peripheral circuits, according to an implementation of the present disclosure.

Referring to FIG. 3, a schematic diagram of a non-volatile storage device including peripheral circuits is shown. Non-volatile storage device 300 may be an example of non-volatile storage device 104 in FIG. 1. The non-volatile storage device 300 may include a memory cell array 301 and a peripheral circuit 302 coupled to the memory cell array 301. Memory cell array 301 may be a NAND flash memory cell array in which memory cells 306 are provided in the form of an array of memory strings 308, with each memory string 308 extending vertically over a substrate (not shown) In some implementations, each memory string 308 may include a plurality of memory cells 306 coupled in series and stacked vertically. Each memory cell 306 may hold a continuous analog value, e.g., such as a voltage or charge, depending on the number of electrons trapped within the area of the memory cell 306. Each memory cell 306 may be a floating-gate memory cell that includes a floating gate transistor or a charge-trap memory cell that includes a charge trap transistor.

In some implementations, each memory cell 306 may be a Single-Level Cell (SLC) that has two possible storage states and thus can store one bit of data. For example, an SLC may have a first storage state "1" and a second storage state "0," where the threshold voltage distribution of the first storage state "1" may correspond to a first voltage range and the threshold voltage distribution of the second storage state "0" may correspond to a second voltage range. The first storage state is an erase state, and the second storage state is a programmed state In some implementations, each memory cell 306 may be a Multi-Level Cell (MLC) capable of storing more than a single bit of data in more than four storage states. For example, an MLC can store two bits of data per cell, three bits of data per cell (also known as a Triple-Level Cell (TLC)), or four bits of data per cell (also known as a Quad-Level Cell (QLC)). Each MLC can be programmed to assume a voltage range of possible threshold voltage distributions. In one example, if each MLC stores two bits of data, the MLC may have a first storage state "11," a second storage state "10," a third storage state "01" and a fourth storage state "00." Here, the threshold voltage distributions of the first, second, third, and fourth storage states correspond to the first, second, third, and fourth voltage ranges, respectively. Among them, the first storage state is an erase state, while the second, third, and fourth storage states are all programmed states. Similarly, TLC can have eight storage states, which may include an erase state and seven programmed states; and QLC can have sixteen storage states, which may include an erase state and fifteen programmed states.

As shown in FIG. 3, each memory string 308 may include a Source Selective Transistor (SST) 310 at its source terminal and a Drain Selective Transistor (DST) 312 at its drain terminal. Source selective transistor 310 and drain selective transistor 312 may be configured to activate selected memory string 308 (e.g., a column of the array) during read and program operations In some implementations, the sources of the memory strings 308 in the same block 304 are coupled through the same source line (SL) 314 (e.g., a common SL). In other words, in some implementations, all memory strings 308 in the same block 304 have an array common source (ACS). In some implementations, the drain of the drain selective transistor 312 of each memory string 308 is coupled to a corresponding bit line (BL) 316, which can read data from or write data into the bit line 316 via an output bus (not shown). In some implementations, each memory string 308 is configured to be selected or deselected by applying to corresponding drain selective transistor 312 a select voltage (e.g., higher than a threshold voltage of a drain selective transistor 312) or a deselection voltage (for example, 0V) via one or more drain selective lines 313, and/or, by applying to corresponding source selective transistor 310 a select voltage (e.g., higher than a threshold voltage of the source selective transistor 310) or a deselection voltage (for example, 0V) via one or more source selective line 315.

As shown in FIG. 3, memory string 308 may be organized into a plurality of blocks 304, each of which may have a source line 314 (e.g., common SL coupled to ground). In some implementations, each block 304 is the basic unit of data for an erase operation, e.g., all memory cells 306 on the same block 304 may be erased concurrently. To erase the memory cells 306 in a selected block, an erase voltage Vers (e.g., a high positive voltage (e.g., 20V or higher)) is bias coupled to source lines 314 of the selected block and of unselected blocks in the same plane as the selected block. It should be understood that, in some examples, erase operations may be performed at half block level, at quarter block level, or at a level of any suitable number of blocks or any fraction of blocks. Memory cells 306 of adjacent memory strings 308 may be coupled by wordlines 318 that select which row of memory cells 306 is affected by read and program operations. In some implementations, each wordline 318 is coupled to a page 320 of memory cells 306. Each wordline 318 may include a plurality of control gates (gate electrodes) at each memory cell 306 in a corresponding page 320 and a gate line coupling the control gates.

It should be noted that the page shown in FIG. 3 is a physical page, which refers to a layer of memory cells on a physical level. The basic data unit for program and read operations is a logical page. For SLC, each memory cell can store 1 bit of information. Thus, on a physical level, the information stored in a layer of memory cells (that is, 1 physical page) corresponds to the information of 1 logical page. For the MLC, each memory cell can store 1 bit of information, and thus, on a physical level, the information stored in a layer of memory cells (that is, 1 physical page) corresponds to the information of 2 logical pages. For TLC, each memory cell can store 1 bit of information, and thus, on a physical level, the information stored in a layer of memory cells (that is, 1 physical page) corresponds to the information of 3 logical pages. For QLC, each memory cell can store 1 bit of information, and thus, on a physical level, the information stored in a layer of memory cells (that is, 1 physical page) corresponds to the information of 4 logical pages.

Figure 4:
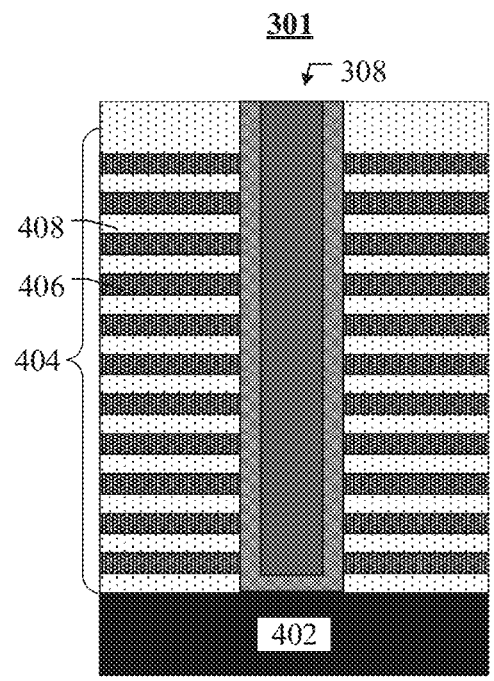
FIG. 4 is a schematic cross-sectional view of a memory cell array including memory strings, according to an implementation of the present disclosure.

Referring to FIG. 4, a schematic cross-sectional view of a memory cell array including memory strings is depicted. As shown in FIG. 4, the memory string 308 may extend vertically above substrate 402 through memory stack layer 404. The substrate 402 may include silicon (e.g., monocrystalline silicon), silicon germanium (SiGe), gallium arsenide (GaAs), germanium (Ge), Silicon-On-Insulator (SOI), Ge-on-Insulator (GOI), or any other suitable material.

The memory stack layer 404 may include alternating gate conductive layers 406 and gate dielectric layers 408. The number of memory cells 306 in memory cell array 301 may be determined from the number of pairs of the gate conductive layer 406 and the gate dielectric layer 408 in the memory stack layer 404. The gate conductive layer 406 may include conductive materials, e.g., such as tungsten (W), cobalt (Co), copper (Cu), aluminum (Al), polysilicon, doped silicon, silicide, any combination thereof, and the like. In some implementations, each gate conductive layer 406 may include a metal layer, e.g., a tungsten layer. In some implementations, each gate conductive layer 406 may include a doped polysilicon layer. Each gate conductive layer 406 may include a control gate surrounding the memory cell 306 and may extend laterally at the top of the memory stack layer 404 as a drain selective line 313, extend laterally at the bottom of the memory stack layer 404 as source selective line 315, or extend laterally between drain selective line 313 and source selective line 315 as wordline 318.

As shown in FIG. 4, memory string 308 includes a channel structure extending vertically through memory stack layer 404. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape) According to some implementations, the semiconductor channel, the tunneling layer, the storage layer, and the barrier layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

According to some implementations, a well (e.g., a P-well and/or an N-well) may be formed in the substrate 402, and the source terminal of the memory string 308 may contact the well. For example, a source line may be coupled to the well to apply an erase voltage to the well (e.g., the source of the memory string) during an erase operation. In some implementations, the memory string further includes a channel plug at the drain terminal of the memory string 308. It should be understood that, although not shown in FIG. 4, additional components of the memory cell array 301 may be formed. These additional components may include, but are not limited to, gate line gaps/source contacts, local contacts, interconnect layers, and the like.

Referring back to FIG. 3, peripheral circuit 302 may be coupled to memory cell array 301 through bit lines 316, wordlines 318, source lines 314, source selective lines 315, and drain selective lines 313. Peripheral circuit 302 may include any suitable analog, digital, and mixed-signal circuitry for applying voltage and/or current signals to each target memory cell 306 and sensing voltage signals and/or current signals from each target memory cell 306 via bit lines 316, wordlines 318, source lines 314, source selective lines 315, and drain selective lines 313, so as to facilitate operation of the memory cell array 301. The peripheral circuit 302 may include various types of peripheral circuits formed using Metal Oxide semiconductor (MOS) technology.

Figure 5:
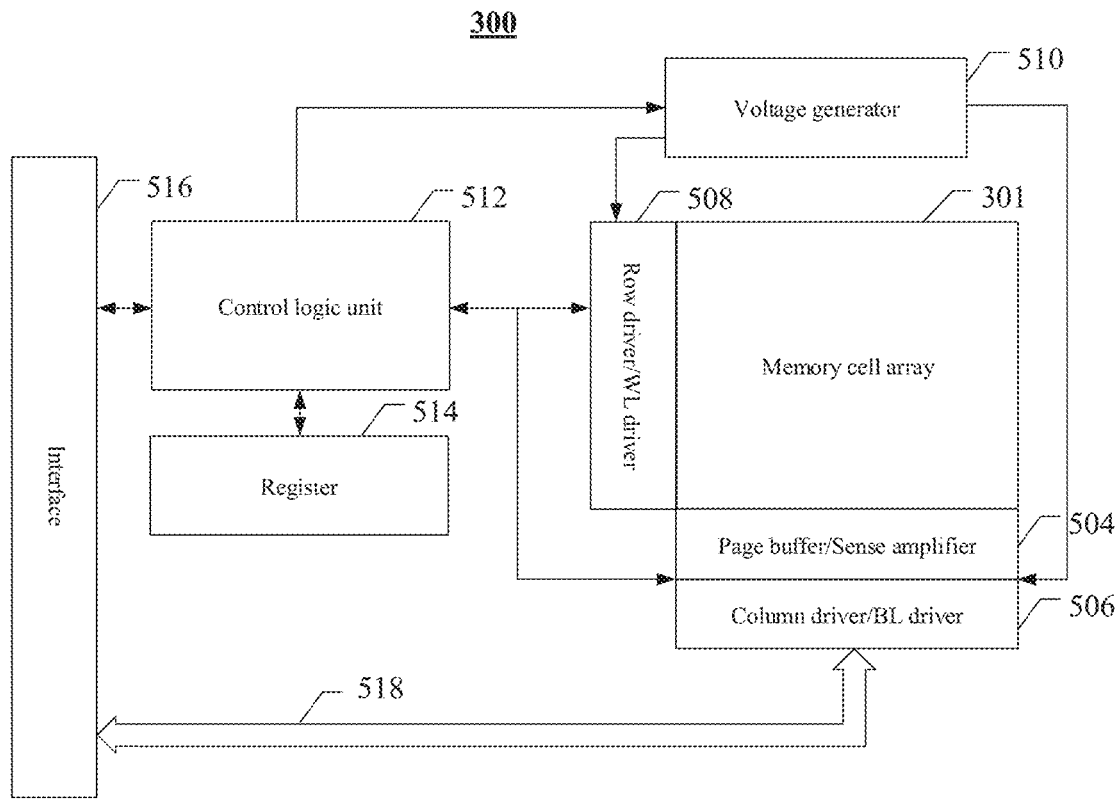
FIG. 5 is a block diagram of a non-volatile storage device including peripheral circuits, according to an implementation of the present disclosure.

Referring to FIG. 5, a block diagram of a non-volatile storage device that includes peripheral circuits is depicted. As shown in FIG. 5. the peripheral circuit includes a page buffer/sense amplifier 504, a column driver/bit line driver 506, a row driver/wordline driver 508, a voltage generator 510, a control logic unit 512, a register 514, an interface (I/F) 516, and data bus 518. It should be understood that in some examples, additional peripheral circuits not shown in FIG. 5 may further be included.

Page buffer/sense amplifier 504 may be configured to read data from and program (write) data to memory cell array 301 according to control signals from control logic unit 512. In another example, page buffer/sense amplifier 504 may perform a program verify operation to ensure that data has been correctly programmed into memory cell 306 coupled to selected wordline 318. In yet another example, page buffer/sense amplifier 504 may further sense a low power signal from bit line 316 that represents a data bit stored in memory cell 306 and amplifies the small voltage swing to a recognizable logic level during a read operation. Column driver/bit line driver 506 may be configured to be controlled by control logic unit 512 and to select one or more memory strings 308 by applying bit line voltages generated from voltage generator 510.

Row driver/wordline driver 508 may be configured to be controlled by control logic unit 512 and select/deselect blocks 304 of memory cell array 301 and select/deselect wordlines 318 of blocks 304. Row driver/wordline driver 508 may further be configured to drive wordline 318 using a wordline voltage generated from voltage generator 510. In some implementations, the row driver/wordline driver 508 can further select/deselect and drive the source selective line 315 and the drain selective line 313. As described in detail below, the row driver/wordline driver 508 is configured to perform erase operations on the memory cells 306 coupled to the selected wordline(s) 318. The voltage generator 510 may be configured to be controlled by the control logic unit 512 and generate wordline voltages (e.g., read voltages, program voltages, pass voltages, local voltages, verify voltages, etc.), bit line voltages and source line voltage to be supplied to the memory cell array 301.

Control logic unit 512 may be coupled to each of the peripheral circuits described above and configured to control the operation of each of the peripheral circuits. Registers 514 may be coupled to the control logic unit 512 and include status registers, command registers and address registers to store status information, command operation codes (OP codes) and command addresses for controlling the operation of each peripheral circuit. Interface 516 may be coupled to control logic unit 512 and act as a control buffer to buffer and relay control commands received from a host (not shown in FIG. 5) to control logic unit 512 and to buffer status information received from control logic unit 512 and relay it to the host Interface 516 may further be coupled to column driver/bit line driver 506 via data bus 518 and act as a data Input/Output (I/O) interface and data buffer to buffer data and relay data to or from memory cell array 301.

The rational planning and use of storage devices in the memory system can optimize the FTL algorithm to achieve high performance, low power consumption, etc. of SSDs. Unqualified management of storage devices in the memory system may cause undesirable performance fluctuations. At present, there is a common problem in the industry that the management of storage devices in memory systems is unqualified This is mainly because the management process of storage devices in memory systems is relatively complicated, and the classification and sorting of storage devices in memory systems need to be combined with FTL to maximize profits. The rational planning and use of the storage devices in the memory system can be managed in units of super blocks.

In view of this, implementations of the present disclosure provide a memory system, an operation method thereof, and a computer-readable storage medium.

Figure 6:
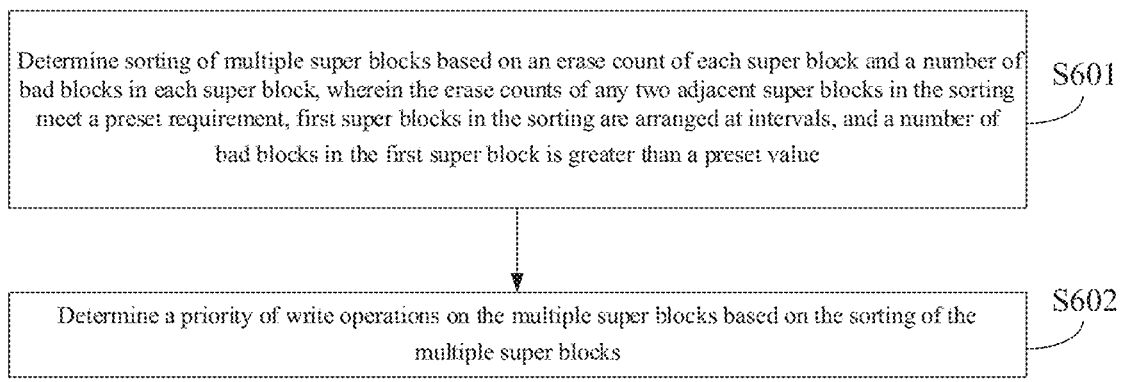
FIG. 6 is a schematic flowchart of an operation method for a memory system, according to an implementation of the present disclosure.
Figure 7:
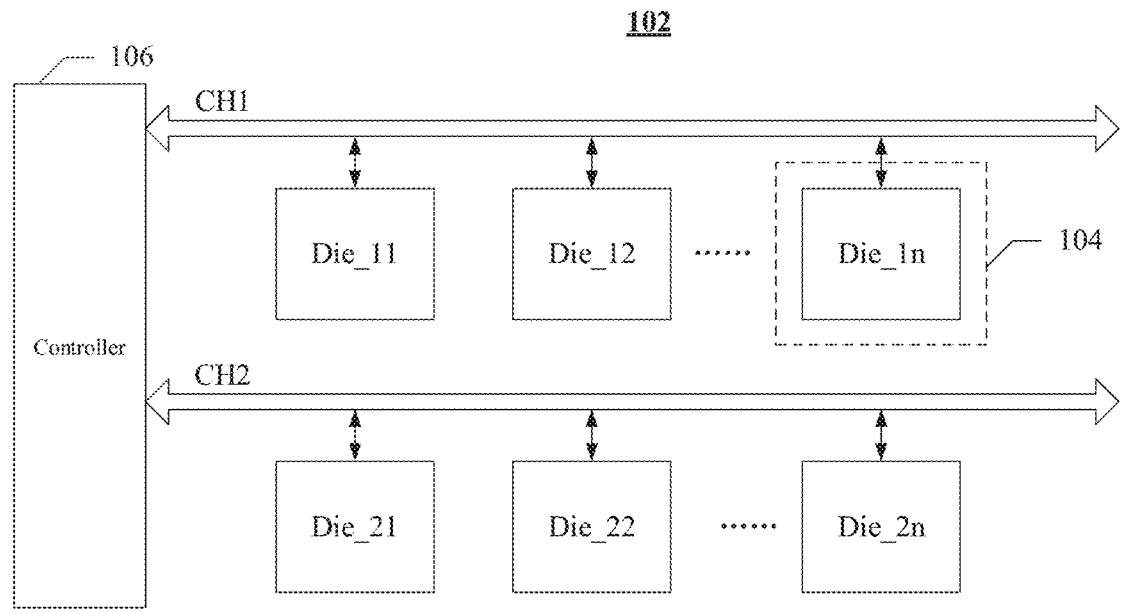
FIG. 7 is a schematic diagram of a memory system, according to an implementation of the present disclosure.

Referring to FIG. 6, a schematic flowchart of an operation method for a memory system is shown. Referring to FIG. 7, a schematic diagram of a memory system according to an implementation of the present disclosure is depicted. As shown in FIG. 6 and FIG. 7, an implementation of the present disclosure provides an operation method for a memory system, and the memory system 102 includes at least one non-volatile storage device 104 and a controller 106 coupled to the non-volatile storage device 104. The non-volatile storage device 104 may include a plurality of blocks, and at least one block in at least one non-volatile storage device 104 constitutes a super block. The method may include the following operations.

Referring to FIG. 6, at operation S601, sorting of multiple super blocks based on an erase count of each super block and a number of bad blocks in each super block may be determined. The erase counts of any two adjacent super blocks in the sorting may meet a preset requirement. First super blocks in the sorting may be arranged at intervals. A number of bad blocks in the first super block is greater than a preset value.

At operation S602, a priority of write operations on the multiple super blocks based on the sorting of the multiple super blocks may be determined.

As shown in FIG. 7, the controller 106 may be respectively connected to a plurality of non-volatile storage devices 104 via a first channel CH1 and a second channel CH2. As an example, the non-volatile storage device 104 may be a die. In an example, the non-volatile storage devices Die_11, Die_12 through Die_1n can be commonly connected to the first channel CH1, and the non-volatile storage devices Die_11, Die_12 through Die_1n can communicate with the controller 106 via the first channel CH1. The non-volatile storage devices Die_21, Die_22 through Die_2n can be commonly connected to the second channel CH2, and the non-volatile storage devices Die_21, Die_22 through Die_2n can communicate with the controller 106 via the second channel CH2, where n is an integer greater than or equal to 1. The implementations of the present disclosure impose no limitation on the number of channels and the number of non-volatile storage devices connected to each channel.

For example, the controller 106 may send the command to the non-volatile storage device Die_11 via the first channel CH1, wherein the command includes an operation type, target data and target address.

Figure 8:
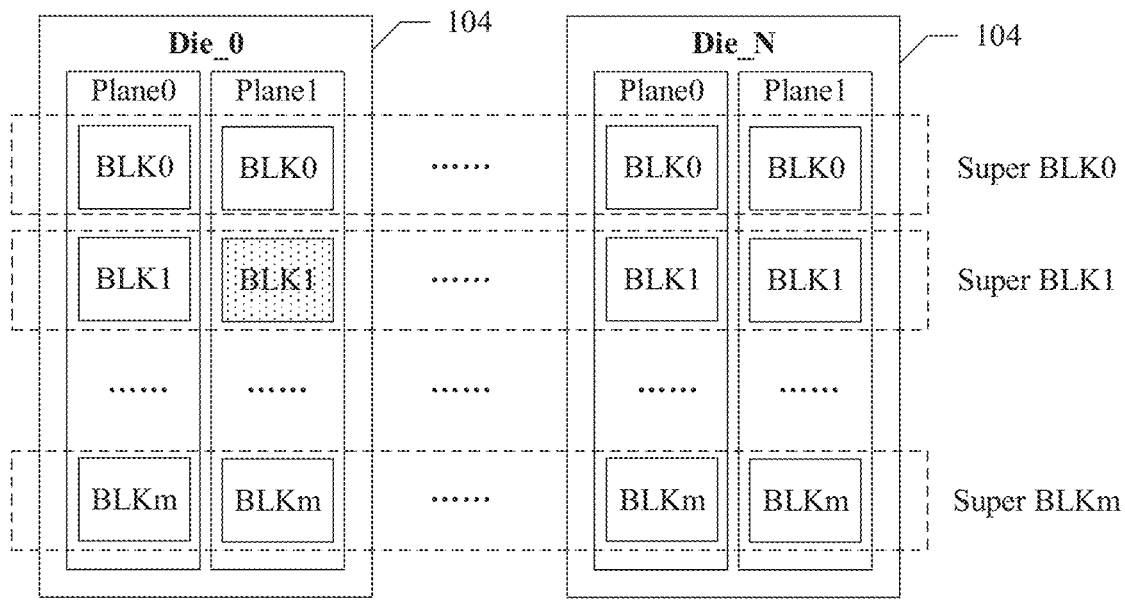
FIG. 8 is a schematic diagram of a super block, according to an implementation of the present disclosure.

Referring to FIG. 8, a schematic diagram of a super block according to an implementation of the present disclosure is shown. The concepts of super block and the number of bad blocks in the super block in the implementation of the present disclosure will be explained in detail below with reference to FIG. 8.

As shown in FIG. 8, each non-volatile storage device, among the non-volatile storage devices Die_0 to Die_N, may include one or more planes. Each plane may include multiple blocks, and each block may include multiple pages. FIG. 8 illustrates that each non-volatile storage device may include two planes (e.g., Plane0 and Plane1), and each plane may include blocks BLK0 to BLKm, where m is an integer greater than or equal to 0. The implementations of the present disclosure impose no limitation on the number of planes included in each non-volatile storage device, the number of blocks included in each plane, and the number of pages included in each block.

In some implementations, the controller may manage the non-volatile storage devices Die_0 to Die_N by using super blocks. The controller manages in units of super blocks, and a super block may include at least one block in at least one non-volatile storage device. As an example, a super block may include blocks with the same serial number in all planes in all non-volatile storage devices.

Still as shown in FIG. 8, the block BLK0 included in each plane of each of the non-volatile storage devices Die_0 to Die_N can jointly constitute a super block Super BLK0, the block BLK1 included in each plane of each of the non-volatile storage devices Die_0 to Die_N can jointly constitute a super block Super BLK1, and the block BLKm included in each plane of each of the non-volatile storage devices Die_0 to Die_N can jointly constitute a super block Super BLKm. In this way, the non-volatile storage devices Die_0 to Die_N may include super blocks Super BLK0 to Super BLKm. Of course, the implementations of the present disclosure makes no limitation on the number of blocks included in the super block. For example, the super block may include blocks with the same serial number in each plane of each non-volatile storage device. For example, the super block includes 2n blocks. The super block may also include blocks with the same serial number of some planes of some non-volatile storage devices. For example, a super block includes 1 block, 2 blocks, or 4 blocks.

The implementation of the present disclosure does not make any special limitation on the way of dividing the super block. For example, a super block may include blocks with the same serial number in each plane of each of at least some non-volatile storage devices coupled to the same channel. For example, a super block may include blocks with the same serial number in each plane of each of the non-volatile storage devices Die_11 to Die_1L (L less than or equal to n) coupled to the first channel CH1 in FIG. 7. A super block may also include blocks with the same serial number in each plane of each of the non-volatile storage devices Die_21 to Die_2L (L is less than or equal to n) coupled to the second channel CH2 in FIG. 7. For example, the super block may also include blocks with the same serial number in each plane of each of the non-volatile storage devices coupled to different channels. For example, a super block may include blocks with the same serial number in each plane of each non-volatile storage device in the non-volatile storage device Die_11 coupled to the first channel CH1 and the non-volatile storage device Die_21 coupled to the second channel CH2 in FIG. 7.

It should be noted that any block schematically shown in FIG. 8 may be a bad physical block, and the bad physical block may also be called a "bad block." In other words, both bad physical blocks and bad blocks belong to the block level. For example, BLK1 of the plane Plane1 of the non-volatile storage device Die_0 is a bad physical block. The sources of these bad physical blocks mainly include factory bad block and grown bad block, for example. Among them, factory bad block refers to more or less bad blocks since coming out of the factory, and grown bad blocks means that as the erase count increases, these blocks may wear out and become bad physical blocks.

The management of bad physical blocks includes two strategies: the first is a skip strategy, and the second strategy is a replace strategy. Skip policy means that when a user writes to a block, a bad physical block will be skipped over and the next block will be written to. For example, when performing a write operation on super block Super BLK0, the more the number of bad physical blocks included in super block Super BLK0, the smaller the space available for writing in super block Super BLK0, and the lower the write rate of write operation on super block Super BLK0.

The replace strategy means that when a user writes to a block, if a bad physical block is encountered, a spare block is used to replace it. For example, when a write operation is performed on the super block Super BLK0 and when the super block Super BLK0 has a bad physical block, the spare block is used to replace the bad physical block, and the space available for writing in super block Super BLK0 remains unchanged.

In the implementations of the present disclosure, the number of bad blocks in the super block is the number of bad physical blocks in the super block, which can also be called the bad plane number of the super block, because the super block can include a plurality of blocks. For example, a super block may include blocks with the same serial number in the planes of the non-volatile storage device. For example, the super block Super BLK1 may include 2n blocks BLK1, the BLK1 of the plane Plane1 of the non-volatile storage device Die_0 may be a bad physical block, and thus, the number of bad physical blocks in the super block is 1. In other words, for the super block Super BLK1, the plane Plane1 of the non-volatile storage device Die_0 may be a bad plane, and then the number of bad planes in the super block is one.

It should be noted that when FTL manages the super block, it can divide the super block into a free block, a closed block, a garbage block, and a bad block. In other words, free blocks, closed blocks, garbage blocks, and bad blocks all belong to super blocks, and all may include multiple blocks.

The concepts of free block, closed block, garbage block, and bad block will be briefly explained below.

A free block refers to a super block that can be used for write operations. In the implementation of the present disclosure, when a write operation is required, the super block with the highest priority for the write operation is selected from the super block sorting as the target super block, and the target data is written into the target super block. A closed block refers to a super block with no or very little remaining storage space. That is to say, the program operation can be performed on a closed block only after the closed block is erased first to free up storage space. The garbage block refers to the super block that will be garbage collected (GC). During garbage collection, it is desired to move the valid data in the garbage block to the target super block, and erase all the data in the garbage block to obtain a new available super block, that is, a free block. Alternatively, during garbage collection, the valid data in the garbage block is moved to the target super block, and the garbage block can be marked as a free block. When writing data to this type of free block, the erase operation will be performed on this type of free block first, and then data is written. A bad block refers to a super block that cannot be used normally, and a bad block with a certain number of blocks among the multiple blocks included in the bad block is a bad block.

In the implementation of the present disclosure, in operation S601, two factors need to be considered when sorting super blocks. The first factor is the erase count of the super block, and the second factor is the number of bad blocks in the super block. The sorting of multiple super blocks is determined based on the erase count of the super block and the number of bad blocks in the super block. For the first factor, the erase counts of any two adjacent super blocks in the sorting meet a preset requirement; and for the second factor, the first super blocks in the sorting are arranged at intervals, and the number of bad blocks in the first super block is greater than a preset value.

Regarding the first factor, it should be noted that the super block includes multiple blocks, and the block is used as the basic data unit of the erase operation. Every time the erase operation is performed on the block, the block will be worn out. Therefore, each block has a lifetime, and the lifetime of a block can be measured by the erase count. When the erase count of the block exceeds the upper limit of the lifetime, the block may be defective and lose the ability to store charges. Therefore, data cannot be written concentratedly on certain blocks. Otherwise, these blocks will soon lose the ability to store charges because their erase counts exceed the upper limit of lifetime. It is often expected all blocks are used to amortize data writing, that is, make each block have substantially the same degree of wear, so as to ensure that the memory system has the maximum amount of data written. Similarly, it is expected all super blocks amortize data writing, that is, make each super block have substantially the same degree of wear, so as to ensure that the memory system has the maximum amount of data written.

In the implementation of the present disclosure, the erase counts of super blocks are taken as the first factor to consider in sorting the super blocks, and the erase counts of any two adjacent super blocks in the sorting of multiple super blocks need to meet the preset requirements. In this way, the degree of wear of each super block is substantially the same, thereby ensuring that the memory system has the maximum amount of data written. How the erase count of the super block meets the preset requirement will be further explained in detail later.

For the second factor, it should be noted that the greater the number of bad blocks there are in the super block, the less space in the super block that can be written. In performing write operation on the super block, the smaller the amount of data within the same duration, the lower the write rate and the worse the performance of the memory system.

In the implementation of the present disclosure, a preset value is set to divide the super block into a first super block, a second super block, and a third super block based on the number of bad blocks in the super block, where the number of bad blocks in the first super block is greater than the preset value, the number of bad blocks in the second super block is greater than 0 and less than or equal to the preset value, and the number of bad blocks in the third super block is equal to 0. In brief, the number of bad blocks in the first super block is large, the number of bad blocks in the second super block is next, and there is no bad block in the third super block. In the sorting, there may be the following five cases for two adjacent super blocks: in the first case, two first super blocks are adjacently arranged; in the second case, the first super block and the second super block are adjacently arranged; in the third case, the first super block and the third super block are adjacently arranged; in the fourth case, two second super blocks are adjacently arranged; and in the fifth case, the second super block and the third super block are adjacently arranged.

As mentioned above, the write rate of the write operation to the third super block is normal, the write rate of the write operation to the second super block is next, and the write rate of the write operation to the first super block is the worst. The write rate of the write operation to the first super block is set as a first write rate, the write rate of the write operation to the second super block is set as a second write rate, and the write rate of the write operation to the third super block is set as a third write rate. The first write rate is less than the second write rate, and the second write rate is less than the third write rate. If two first super blocks are adjacently arranged, the write rate is reduced to the first write rate when performing a write operation on the first one of the first super blocks, and the write rate is continuously maintained at the first write rate when continuing to perform the write operation on the second one of the first super blocks. In this way, the write rate of the memory system will suddenly decrease to the first write rate and last for a long time, which will cause undesirable performance fluctuations of the memory system. In other words, two first super blocks are adjacently arranged, and the performance of the memory system is most seriously affected when a write operation is performed.

It should be emphasized that in the implementation of the present disclosure, a preset value can be set so as to divide the super blocks into different types based on the number of bad blocks in the super block. The purpose of setting the preset value to divide the super block into different types is to determine the write rate of write operation to the super block based on the number of bad blocks in the super block. The preset value herein is not a fixed value, and different preset values can be set for different situations. The preset value is only used to distinguish different write rates of different super blocks. For example, the write rate when performing a write operation on the first super block is lower than the write rate when performing a write operation on the second super block.

By way of example, the number of sorted super blocks may even be in the hundreds, and then the sorted super block list is very long. Different preset values can be determined for the number of bad blocks in each super block in the sorting. For example, the range of the number of bad blocks in the super block is 0 to 5 from the 1st to the 10th super block in the sorting, and the preset value can be set to 3 at this time. At this time, the number of the bad blocks in the first super block is greater than 3, the number of bad blocks in the second super block is greater than 0 and less than or equal to 3, and the number of bad blocks in the third super block is equal to 0. For another example, the range of the number of bad blocks in the super block is 0 to 20 from the 50th to the 60th super block in the sorting, then the preset value can be set to 10 at this time. At this time, the number of bad blocks in the first super block is greater than 10, the number of bad blocks in the second super block is greater than 0 and less than or equal to 10, and the number of bad blocks in the third super block is equal to 0. In the implementations of the present disclosure, the specific preset values are used for illustration only, and make no limitation to the preset values of the present disclosure.

In some implementations, the first preset value and the second preset value can be set to divide the super block into the following four different types based on the number of bad blocks in the super block, where the first preset value is less than the second preset value. A plurality of super blocks may include a first super block, a second super block, a third super block and a fourth super block, where the number of bad blocks in the first super block is greater than a second preset value, the number of bad blocks in the second super block is greater than the first preset value and less than or equal to the second preset value, the number of bad blocks in the third super block is greater than 0 and less than or equal to the first preset value, and the number of bad blocks in the fourth super block is equal to 0. Of course, more preset values can be set to divide the super block into more types. In this way, the operation of the memory system will be more refined, and the complexity of super block management will increase accordingly In yet another example, the first preset value is set to 5, and the second preset value is set to 10. At this time, the number of bad blocks in the first super block is greater than 10, the number of bad blocks in the second super block is greater than 5 and less than or equal to 10, the number of bad blocks in the third super block is greater than 0 and less than or equal to 5, and the number of bad blocks in the fourth super block is equal to 0.

For ease of description, in the implementation of the present disclosure, the following description will be made on the case of dividing a super block into the first super block, the second super block, and the third super block.

In the implementation of the present disclosure, the number of bad blocks in the super block is taken as the second factor in considering the sorting of the super blocks. As mentioned above, two first super blocks are adjacently arranged. The impact on the performance of the memory system is the most serious when performing the write operation, and the first super block is arranged at intervals in the super block sorting, so that the write rate of the memory system will not last for a long time after a sudden drop, which can reduce the performance fluctuation of the memory system. Arranging first super block at intervals in the sorting refers to avoiding the situation that two first super blocks are adjacently arranged in the sorting; that is to say, the first super block and the second super block are adjacently arranged in the sorting or the first super block and the third super block are adjacently arranged in the sorting. Determining the sorting of multiple super blocks according to the number of bad blocks in the super block will be further explained in detail later.

In the implementation of the present disclosure, at operation S602, the corresponding relationship between the sorting of multiple super blocks and the priorities of write operations on multiple super blocks includes two situations. The priority of write operations on multiple super blocks refers to the order of write operations on multiple super blocks In the first case, the higher the rank of the super block in the sorting, the higher the priority of write operation to the super block. In other words, when performing a write operation on a super block, the super block that is sorted higher is used first. These super blocks are sequentially used to perform the write operation from beginning to end according to the sorting of multiple super blocks. In the second case, the higher the rank of the super block in the sorting, the lower the priority of write operations to the super block. In other words, when performing a write operation on a super block, the super block that is ranked lower is used first. These super blocks are sequentially used to perform the write operation from end to beginning according to the sorting of multiple super blocks.

In the implementation of the present disclosure, both the erase count of the super block and the number of bad blocks in the storage are considered to determine the priority of the write operation on the super block, which can effectively smooth the write performance and enhance the performance stability of the memory system.

In the implementation of the present disclosure, an improvement to the FW algorithm in the controller in the memory system may be achieved without adding additional cost.

It should be noted that if the erase count of multiple super blocks in the sorting are the same or similar, and the number of bad blocks in the super blocks is large, the write rate will suddenly drop and last for a long time when these super blocks are written in sequence. This may cause an undesirable performance fluctuation of the memory system. In the implementation of the present disclosure, when sorting multiple super blocks, both the erase count of the super blocks and the number of bad blocks in each super block are taken into account under the condition that the erase count meets the preset requirements. This may effectively prevent large and long-term performance fluctuations of the memory system, smooth the write performance, and enhance the performance stability of the memory system.

In some implementations, the higher a rank of the super block in the sorting, the higher the priority of write operations on the super block by the controller. In some implementations, the erase count of the super block that is ranked higher in any two adjacent super blocks in the sorting may be less than or equal to the erase count of the super block that is ranked lower. In some implementations, the erase count of the super block that is ranked higher in any two adjacent super blocks in the sorting may be greater than an erase count of the super block that is ranked lower. In some implementations, a difference between the erase counts of two super blocks may be less than a preset difference.

In some implementations, the higher the rank of the super block in the sorting, the lower the priority of write operations on the super block by the controller. In some implementations, the erase count of the super block that is ranked higher in any two adjacent super blocks in the sorting may be greater than or equal to the erase count of the super block that is ranked lower. In some implementations, the erase count of the super block that is ranked higher in any two adjacent super blocks in the sorting may be less than an erase count of the super block that is ranked lower. In some implementations, the difference between the erase counts of the two super blocks is less than the preset difference.

In the implementation of the present disclosure, in the first case, the higher the rank of the super block in the sorting, the higher the priority of the write operation to the super block. The erase count of super blocks in the sorting can be arranged in ascending order, that is, the erase count of the super block that is ranked higher in any two adjacent super blocks in the sorting is less than or equal to an erase count of the super block that is ranked lower. Alternatively, the erase count of the super block that is ranked higher in any two adjacent super blocks in the sorting is greater than an erase count of the super block that is ranked lower, and a difference between the erase counts of two super blocks is less than a preset difference. In this way, when performing a write operation on a super block, the super block with a smaller erase count is first used from beginning to end as much as possible, so that the wear degrees of the super blocks are substantially the same. Even in the case of considering the number of bad blocks in the super block, the super block with a larger erase count is used first and then the super block with a smaller erase count is used next, when performing write operation on the super block. The difference between the erase counts of the two blocks is smaller than the preset difference. It is possible to ensure that the degrees of wear between the super blocks are substantially the same while smoothing the write performance of the memory system.

In the implementation of the present disclosure, in the second case, the higher the rank of the super block in the sorting, the lower the priority of write operation to the super block. The erase count of super blocks in the sorting can be arranged in descending order, that is, the erase count of the super block that is ranked higher in any two adjacent super blocks in the sorting is greater than or equal to an erase count of the super block that is ranked lower. Alternatively, the erase count of the super block that is ranked higher in any two adjacent super blocks in the sorting are less than an erase count of the super block that is ranked lower, and the difference between the erase counts of the two super blocks is less than the present difference. In this way, when performing a write operation on a super block, the super block with a smaller erase count is first used from end to beginning as much as possible, so that the wear degrees of the super blocks are substantially the same. Even in the case of considering the number of bad blocks in the super block, the super block with a larger erase count is used first and then the super block with a smaller erase count, when performing write operation on the super block. The difference between the erase counts of the super blocks is smaller than the preset difference. It is possible to ensure that the wear degrees of the super blocks are substantially the same while smoothing the write performance of the memory system.

In the implementation of the present disclosure, the preset difference may be set according to the performance test data of the memory system. For example, the preset difference can be 5. When performing a write operation, the super block with a larger erase count (for example, an erase count of 10) can be used first, and then a super block with a smaller erase count (for example, an erase count of 6) can be used next. The difference between the erase counts of adjacent super blocks is less than the preset difference. If a super block with a larger erase count (for example, 18) is used first and then a super block with a smaller erase count (for example, 6) is used next when performing a write operation, the difference between the erase counts of the adjacent super blocks is larger than the preset difference, which may also cause performance fluctuations of the memory system.

In the implementation of the present disclosure, the sorting of the multiple super blocks may be obtained according to the priority of the write operation to the super block (e.g., the sequence of the write operation to the super block). Furthermore, the erase count of each super block and the number of bad blocks in each super block can also be obtained. Combined with the above sorting of multiple super blocks, the rule of sorting multiple super blocks can be obtained.

An implementation of the present disclosure provides a memory system, including at least one non-volatile storage device and a controller coupled to the non-volatile storage device, where the controller includes a first interface coupled to a host and a second interface coupled to non-volatile storage device. The controller may be configured to perform the following operations.

For instance, the controller may be configured to send a write command to the non-volatile storage device via the second interface. The amount of data included in the write command may be greater than the storage capacity of two super blocks. The write command includes physical addresses mapped to multiple target super blocks, and multiple target super blocks appear in the write command according to the order of priority. According to the erase count of each super block and the number of bad blocks in each super block, the sorting of multiple super blocks may be determined, where the erase counts of any two adjacent super blocks in the sorting meet the preset requirements. The first super blocks may be arranged at intervals in the sorting, and the number of bad blocks in the first super block is greater than the preset value. According to the sorting of multiple super blocks, the priority of write operations to multiple super blocks may be determined; and In response to the write command sent from the second interface, writing, by the non-volatile storage device, data into corresponding super blocks sequentially according to the sequence of physical addresses.

In the above implementations, the write command may be a write command from the receiving host, a write command during garbage collection, a write command during dynamic wear leveling, or a write command during static wear leveling.

For example, the timing of sorting multiple super blocks in the operation method provided by the implementations of the present disclosure may be, for example: after garbage collection, after a certain super block is marked as a closed block, or after a certain block in a certain super block is marked as a bad block (or bad physical block).

Here, the timing of sorting multiple super blocks in the operation method provided by the implementation of the present disclosure may be after garbage collection, utilizing the operation method provided by the implementation of the present disclosure to sort the free blocks obtained during the garbage collection. In the operation method provided by the implementation of the present disclosure, the timing of sorting multiple super blocks may be after a certain super block is marked as a closed block. This is because when a certain super block is marked as a closed block, the closed block no longer participates in the sorting process. In the operation method provided by the implementation of the present disclosure, the timing of sorting multiple super blocks can be after a certain super block is marked as a closed block or after a certain block in a certain super block is marked as a bad block (or a bad physical block). This is because when the number of bad blocks in a certain super block changes, the factors that affect the sorting of super blocks change. Consequently, it may be desirable to adjust the order or position of the super block by using the operation method according to the implementations of the present disclosure.

In some implementations, the above-mentioned write operation includes at least one of the following: a write operation corresponding to a write operation command from the host received by the controller, a write operation during garbage collection, a write operation during dynamic wear leveling, and write operations during static wear leveling.

In the implementation of the present disclosure, both the erase count of the super block and the number of bad blocks in the super block are considered to determine the order of multiple super blocks. According to the sorting of multiple super blocks, the priority of performing write operation on the super block is determined. Before the write operation is performed on the super block, the sorting of multiple super blocks is determined. In the implementations of the present disclosure, the application scenarios for performing write operation on super blocks are not particularly limited, and the application scenarios for performing write operation on super blocks include but are not limited to the above-mentioned write operations in response to receiving write operation commands from the host, write operations during garbage collection and write operations during wear leveling (including dynamic wear leveling and static wear leveling). The above three application scenarios will be explained in detail below.

In a specific example, the above-mentioned write operation includes, e.g., host write.

Here, the operation method provided by the implementation of the present disclosure is applied to perform the write operation in response to receive the write operation command from the host. Considering that the memory system includes multiple super blocks, the implementations of the present disclosure provide an operation method for selecting a target super block among the multiple super blocks. In the implementation of the present disclosure, both the erase count of each super block and the number of bad blocks in each super block are considered to determine the sorting of multiple super blocks. The erase counts of any two adjacent super blocks in the sorting meet the preset requirements. The first super blocks are arranged at intervals in the sorting, and the number of bad blocks in the first super block is greater than the preset value. According to the sorting of multiple super blocks, the priority of write operations to multiple super blocks may be determined. The super block with the highest priority for the write operation may be determined as the target super block. In this way, the write rate can be smoothed without causing undesirable performance fluctuations of the memory system.

In a specific example, the above write operation includes: writing the target data into the target super block during garbage collection.

Here, the operation method provided by the implementation of the present disclosure is applied to perform the write operation during garbage collection. In an example, the process of garbage collection is divided into the following three steps: the first step is to select the source super block (that is, garbage block), where valid data and invalid data are stored on the source super block, and the super block with the least valid data is often selected as the source super block; the second step is to find valid data from the source super block; and the third step is to write the valid data into the target super block. In this way, all data in the source super block can be erased to obtain a new usable super block (that is, a free block). The above valid data moved from the source super block to the target super block is the target data. Considering that the memory system includes multiple super blocks, the implementations of the present disclosure provide an operation method for selecting a target super block from the multiple super blocks. In the implementation of the present disclosure, both the erase count of each super block and the number of bad blocks in each super block are considered to determine the sorting of multiple super blocks. The erase counts of any two adjacent super blocks in the sorting meet the preset requirements. The first super blocks are arranged at intervals in the sorting, and the number of bad blocks in the first super block is greater than the preset value. According to the sorting of multiple super blocks, the priority of write operations to multiple super blocks is determined. The super block with the highest priority for the write operation may be determined as the target super block. In this way, the write rate can be smoothed without causing undesirable performance fluctuations of the memory system.

It should be noted that after erasing all the data in the source super block to obtain a new useable super block, the new useable super block (that is, a free block) can also be added to the sorting list according to the operation method provided by the implementation of the present disclosure to determine the priority of the write operation to the super block.

In one example, the above write operation includes: writing the first target data into the first target super block during the dynamic wear leveling and writing the second target data into the second target super block during the static wear leveling.

Here, the operation method provided by the implementation of the present disclosure is applied to perform the write operation during the wear leveling. In an example, wear leveling includes dynamic wear leveling and static wear leveling. Dynamic wear leveling refers to writing hot data into a super block with a small erase count. That is, when selecting a super block for writing, the super block with a small erase count is first selected. At this time, the hot data is the first target data, and the super block with a small erase count is the first target super block.

Static wear leveling refers to writing cold data to a super block with a large erase count. At this time, the cold data is the second target data, and the super block with a larger erase count is the second target super block. Considering that the memory system includes a plurality of super blocks, the implementations of the present disclosure provide an operation method for selecting a first target super block and a second target super block among the multiple super blocks, while considering the erase count of each super block and the number of bad blocks of each super block to determine the sorting of multiple super blocks; the erase counts of any two adjacent super blocks in the sorting meet the preset requirements; the first super blocks are arranged at intervals in the sorting, the number of bad blocks in the first super block is greater than the preset value; according to the sorting of multiple super blocks, the priority of write operations to multiple super blocks is determined; the super block with the highest priority for write operations can be determined as the first target super block, and the super block with the lowest priority for write operation may be determined as the second target super block. In this way, the write rate can be smoothed without causing undesirable performance fluctuations of the memory system.

In some implementations, before S601, the above operation method further includes:

determining the pre-sorting of the multiple super blocks based on the erase count of each super block, wherein the multiple super blocks are sequentially arranged in ascending order or descending order based on the erase count in the pre-sorting.

In the implementation of the present disclosure, the pre-sorting of multiple super blocks may be determined according to the erase count of each super block. The correspondence between the erase count of the super block and the pre-sorting of the super block includes two cases. In the first case, the smaller the erase count of the super blocks in the pre-sorting, the higher the pre-sorting of the super blocks; that is, the multiple super blocks are arranged in ascending order based on the erase count in the pre-sorting. In the second case, the greater the erase count of the super blocks in the pre-sorting, the higher the pre-sorting of the super blocks; that is, the multiple super blocks in the pre-sorting are arranged in descending order based on the erase count.

It should be noted that after determining the pre-sorting of multiple super blocks, it may be desirable to adjust the order and position of the super blocks by considering the number of bad blocks in the super block at the same time. During the adjustment, the erase count of any two adjacent super blocks meeting the preset requirements may be taken as a limiting condition, ensuring that both the erase count of the super block and the number of bad blocks in the storage are considered to determine the priority of write operations to the super block, which not only effectively smooths the writing performance and enhances the performance stability of the memory system, but also makes the wear degree of each super block substantially the same. This may ensure that the memory system has the maximum amount of data written.

As mentioned above, the preset value is set to divide the super block into the first super block, the second super block and the third super block based on the number of bad blocks in the super block. The number of bad blocks in the first super block is greater than a preset value, the number of bad blocks in the second super block is greater than 0 and less than or equal to the preset value, and the number of bad blocks in the third super block is equal to 0. If two first super blocks are adjacently arranged, the write rate will suddenly decrease and last for a long time when performing the write operation on the two super blocks, which may cause an undesirable performance fluctuation of the memory system.

In some implementations, after determining the pre-sorting of multiple super blocks based on the erase count of each super block, the above operation method may include the following.

For instance, the method may include determining at least two adjacently arranged first super blocks based on the pre-sorting of the multiple super blocks. The method may include adjusting an order or a position of the first super block based on the number of bad blocks in the first super block to determine a first sub-sorting of the multiple super blocks. The erase counts of any two adjacent super blocks in the first sub-sorting may meet the preset requirements, and the first super blocks in the first sub-sorting may not be adjacently arranged.

In the implementation of the present disclosure, at least two adjacently arranged first super blocks are determined based on the pre-sorting of multiple super blocks. Since the number of bad blocks in the first super block is greater than the preset value, the write rate may suddenly decrease and last for an undesirable length when performing write operations on at least two adjacent first super blocks. This may increase the number of performance fluctuations of the memory system. Therefore, when adjusting the pre-sorting of super blocks, the order or position of the first super blocks adjacently arranged is first adjusted to obtain the first sub-sorting. Thus, the first super blocks in the first sub-sorting are not arranged adjacently. Alternatively, the first super blocks in the first sub-sorting are arranged at intervals, that is, other super blocks (e.g., the second super block or the third super block) are arranged between two first super blocks.

It should be noted that, in the process of adjusting the order or position of the adjacently arranged first super blocks, the erase count of any two adjacent super blocks meeting the preset requirements is taken as a restrictive condition, so that the erase counts of any two adjacent super blocks in the first sub-sorting meet the preset requirements.

It should be emphasized that, according to the pre-sorting of multiple super blocks, at least two adjacent first super blocks are determined. Here, the number of adjacently arranged first super blocks in the pre-sorting of multiple super blocks is greater than or equal to two. For example, three first super blocks are arranged consecutively in the pre-sorting. In addition, there may be at least two adjacent first super blocks at multiple positions in the pre-sorting of multiple super blocks. As mentioned above, the super block list is very long, and there may be more than one case in which at least two first super blocks are adjacently arranged.

In some implementations, the first super block and the second super block are adjacently arranged in the first sub-sorting. Alternatively, the first super block and the third super block are adjacently arranged in the first sub-sorting.

In the implementation of the present disclosure, after adjusting the order or position of at least two adjacently arranged first super blocks, the first sub-sorting is obtained. The first super block and the second super block are adjacently arranged in the first sub-sorting. Alternatively, the first super block and the third super block are adjacently arranged in the first sub-sorting.

It should be noted that, if two first super blocks are adjacently arranged, the write rate of the memory system may suddenly decrease to the first write rate and last for a long time when performing a write operation on the two first super blocks. In other words, the duration in which the write rate is the first write rate is the time taken to perform write operations on two first super blocks, may result in undesirable performance fluctuations of the memory system. If the second super block or the third super block is arranged between the two first super blocks, the write rate of the memory system will first decrease to the first write rate, then increase to the second write rate (or the third write rate), and finally decrease to the first write rate when the first super block, the second super block (or the third super block); and the first super block are sequentially written (e.g., the duration in which the write rate is the first write rate is the time taken to perform write operations on one first super block). Compared with the case where two first super blocks are adjacently arranged, it can effectively avoid the process of reducing the write rate of the memory system from lasting for a long time, while at the same time reducing the performance fluctuation of the memory system.

In the implementations of the present disclosure, after adjusting the order or position of the first super block, the first sub-sorting is obtained. In the first sub-sorting, the situation that the first super block and the second super block are adjacently arranged still exist. Because the number of bad blocks in the first super block is greater than the preset value, and the number of bad blocks in the second super block is greater than 0 and less than or equal to the preset value, the write rate will suddenly decrease and last for a certain period of time when the first super block and the second super block arranged adjacently are written sequentially. This may cause certain performance fluctuations in the memory system. Therefore, it may be desirable to adjust the order or position of the adjacently arranged first super block and second super block to further optimize the operation method for the memory system.

In some implementations, after adjusting the order or position of the first super block based on the number of bad blocks in the first super block to determine the first sub-sorting of multiple super blocks, the above operation method may further include the following.

For example, the method may include determining adjacently arranged first super blocks and second super blocks based on the first sub-sorting of the multiple super blocks. The method may include adjusting the order or position of the first super block and the second super block based on the numbers of bad blocks in the first super block and the second super block to determine a second sub-sorting of the multiple super blocks. The erase counts of any two adjacent super blocks in the second sub-sorting may meet a preset requirement, and the first super block and the second super block in the second sub-sorting may not be adjacently arranged.

In the implementation of the present disclosure, it is considered that when the adjacently arranged first super block and second super block are sequentially written, the write rate will also suddenly decrease and last for a certain period of time, which may cause a performance fluctuation of the memory system. Therefore, the order or position of the first super block and the second super block adjacently arranged is adjusted to obtain the second sub-sorting. Thus, the first super block and second super block are not adjacently arranged in the second sub-sorting. Alternatively, the first super block and second super block in the second sub-sorting are arranged at intervals. That is, other super blocks (e.g., the second super block or the third super block) are arranged between the first super block and the second super block.

It should be noted that, in the process of adjusting the order or position of the adjacent first super block and second super block, the erase counts of any two adjacent super blocks meeting the preset requirements is taken as a restrictive condition so that the erase counts of any two adjacent super blocks in the second sub-sorting meet the preset requirement.

In some implementations, two second super blocks are adjacently arranged in the second sub-sorting; or the first super block and the third super block in the second sub-sorting are adjacently arranged; or the second super block and the third super block in the second sub-sorting are adjacently arranged.

In the implementation of the present disclosure, the second sub-sorting is obtained after adjusting the order or position of the adjacently arranged first super block and second super block. In the second sub-sorting, the first super block and the second super block are adjacently arranged. Alternatively, the first super block and the third super block are adjacently arranged in the second sub-sorting.

It should be noted that if the first super block and the second super block are adjacently arranged, when the first super block and the second super block are written in sequence, the write rate of the memory system will first decrease to the first write rate, and then increase to the second write rate, and the write rate will suddenly decrease and last for a certain period of time. which will cause certain performance fluctuations of the memory system. If there is a second super block or a third super block between the first super block and the second super block, when the first super block, the second super block (or the third super block), and the second super block are written in sequence, the write rate of the memory system will first decrease to the first write rate, then increase to the second write rate (or, first decrease to the first write rate, and then increase to the third write rate, and finally decrease to the second write rate). Compared with the case where the first super block and the second super block are adjacently arranged, it can effectively avoid the process of reducing the write rate of the memory system from lasting for a certain period of time, and reduce the performance fluctuation of the memory system.

In the implementation of the present disclosure, the second sub-sorting is obtained after adjusting the order or position of the first super block and the second super block, and in the second sub-sorting there is still situations in which the second super blocks are adjacently arranged. Because the number of bad blocks in the second super block is greater than 0 and less than or equal to the preset value, when the adjacent second super blocks are sequentially written, the write rate will also decrease for a certain period of time. This may cause performance fluctuations in the memory system. Therefore, it may be desirable to adjust the order or position of the adjacent second super blocks to further optimize the operation method for the memory system.

In some implementations, after adjusting the order or position of the first super block and the second super block based on the numbers of bad blocks in the first super block and the second super block to determine a second sub-sorting of the multiple super blocks, the above operation method may further include the following.

For example, the method may include determining at least two adjacently arranged second super blocks based on the second sub-sorting of the multiple super blocks. The method may include adjusting the order or position of the second super block based on the number of bad blocks in the second super block to determine the sorting of the multiple super blocks. The second super blocks in the sorting may not be adjacently arranged.

In implementations of the present disclosure, it is considered that when the write operation is sequentially performed on the adjacently arranged second super blocks, the write rate will also decrease to a certain extent and last for a certain period of time, which will cause certain performance fluctuations of the memory system. Therefore, the order or position of the adjacently arranged second super blocks may be adjusted to obtain a sorting to make the second super blocks not arranged adjacently in the sorting, or make the second super blocks in the sorting arranged at intervals. That is, another super block (e.g., a third super block) is arranged between the second super blocks.

It should be noted that, in the process of adjusting the order or position of the adjacently arranged second super blocks, the erase counts of any two adjacent super blocks meeting the preset requirements is taken as a restriction condition, so that the erase counts of any adjacent two super blocks in the sorting meet the preset requirements.

In some implementations, the second super block and the third super block are adjacently arranged in the sorting.

In the implementation of the present disclosure, after adjusting the order or position of the adjacently arranged second super blocks, a sorting is obtained. In the sorting, the second super block and the third super block are adjacently arranged.

It should be noted that, if two second super blocks are adjacently arranged, the write rate of the memory system will also decrease and last for a certain period of time (e.g., the duration in which the write rate is the second write rate is the time taken to perform write operations on two second super blocks) when the write operation is performed on the two second super blocks, which will cause certain performance fluctuations of the memory system. If there is a third super block arranged between the two second super blocks, the write rate of the memory system will first decrease to the second write rate, then increase to the third write rate, and finally decrease to the second write rate when the second super block, the third super block, and the second super block are sequentially written (e.g., the duration in which the write rate is the second write rate is the time taken to perform write operations on one second super block). Compared with the case where two second super blocks are adjacently arranged, it can effectively avoid the process of reducing the write rate of the memory system from lasting for a certain period of time, and reduce the performance fluctuation of the memory system.

Figure 9:
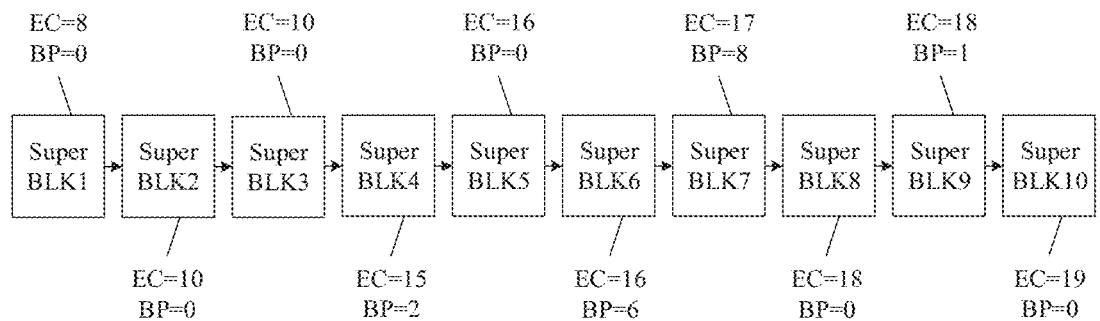
FIG. 9 is the sorting of super blocks, according to an implementation of the present disclosure.

Referring to FIG. 9, the sorting of super blocks according to one example of the present disclosure is depicted. For instance, FIG. 9 shows the sorting of super blocks Super BLK1 to Super BLK10, and the erase count EC and the number of bad planes BP of each super block (e.g., the number of bad blocks in each super block). The sorting of super blocks Super BLK1 to Super BLK10 shown in FIG. 9 is sorted in ascending order based on their erase counts, and the sorting of super blocks Super BLK1 to Super BLK10 does not take into account the number of the bad blocks in each super block. It is possible that the number of bad blocks in two adjacent super blocks are undesirably large. For example, the super block Super BLK6 and the super block Super BLK7 are adjacently arranged, the number of bad blocks in the super block Super BLK6 is 6, and the number of bad blocks in the super block Super BLK7 is 8.

Figure 10:
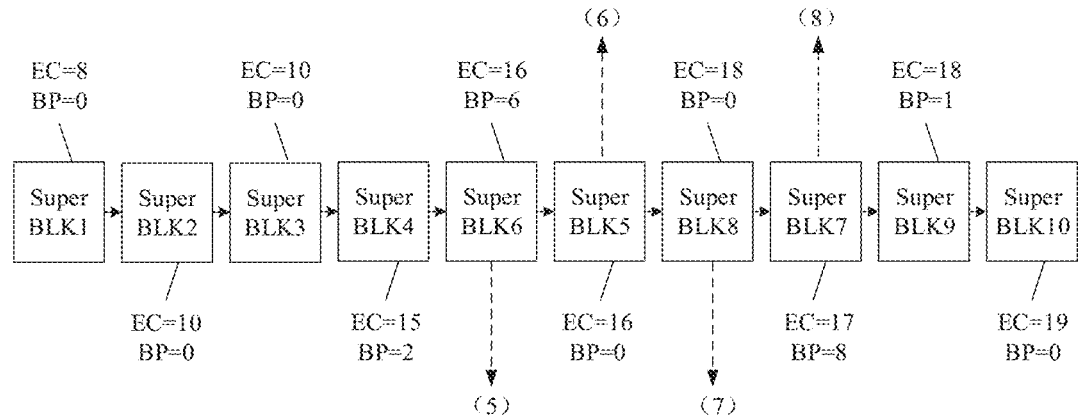
FIG. 10 is the sorting of super blocks, according to an implementation of the present disclosure.

Referring to FIG. 10, the sorting of super blocks according to another example of the present disclosure is depicted. For example, FIG. 10 also shows the sorting of super blocks Super BLK1 to Super BLK10, and the erase count EC of each super block and the number of bad planes BP (that is, the number of bad blocks in each super block). However, there are obvious differences between the sorting of super blocks shown in FIG. 10 and the sequence of super blocks shown in FIG. 9. Based on the sorting of the super blocks shown in FIG. 9, the order (or position) of the super block Super BLK5 and the super block Super BLK6 are exchanged with each other, and the order (or position) of the super block Super BLK7 and the super block Super BLK8 are exchanged with each other. In this way, in the sorting as shown in FIG. 10, the super block with the serial number (5) is the super block Super BLK6, the super block with the serial number (6) is the super block Super BLK5, the super block with the serial number (7) in the sorting is the super block Super BLK8, and the super block with the serial number (8) is the super block Super BLK7.

Here, first, considering the super blocks Super BLK4 to Super BLK9, the difference between the erase counts of any two adjacent super blocks is less than 5. That is, the erase counts of any two adjacent super blocks meet the preset requirements. Therefore, the order or position of the super blocks Super BLK5 and Super BLK6, and the super blocks Super BLK7 and Super BLK8 can be adjusted. Secondly, considering that there are large number of bad blocks in the super blocks Super BLK6 and Super BLK7, the order or position of the super blocks Super BLK6 and Super BLK7 can be adjusted so that the super blocks Super BLK6 and Super BLK7 are not adjacently arranged.

Figure 11:
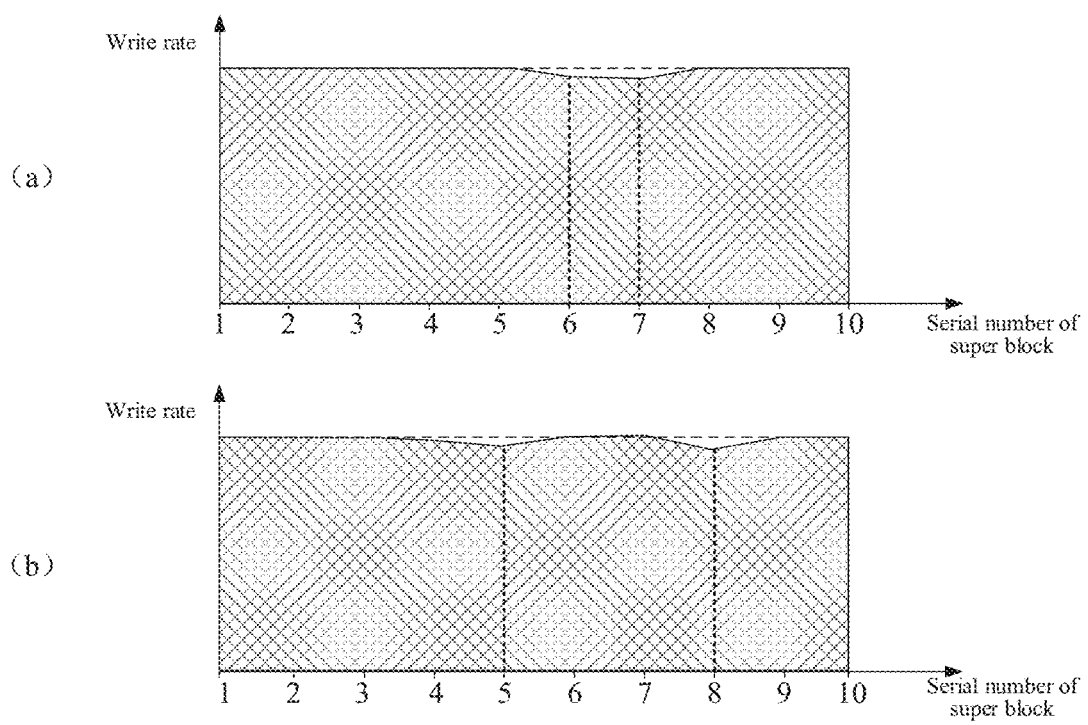
FIG. 11 is a graph of the write rate of each super block in the sorting, according to an implementation of the present disclosure.

Referring to FIG. 11, a graph of the write rate of each super block in the sorting is illustrated. The abscissa in FIG. 11 is the serial number of each super block in the sorting, and the ordinate is the write rate. Graph (a) of FIG. 11 shows the write rate of each super block in the sorting of FIG. 9, and Graph (b) of FIG. 11 shows the write rate of each super block in the sorting of FIG. 10.

As shown in Graph (a) of FIG. 11, when the super blocks in the sorting are sequentially written, when a write operation is performed on the super block Super BLK6 the write rate drops suddenly and lasts until the write operation to the super block Super BLK7 is completed, due to the large number of bad blocks in the super block Super BLK6 and the super block Super BLK7. The write rate drops and lasts for a long time, which may result in undesirable performance fluctuations of the memory system.

As shown in Graph (b) of FIG. 11, after the sorting of super blocks is adjusted, the super block with the serial number (5) in the sorting is the super block Super BLK6, and the super block with the serial number (8) is the super block Super BLK7. When writing to the super blocks in the sorting in sequence, since there are large number of bad blocks in the super block with the serial number (5) and the super block with the serial number (8), the write rate will decrease when performing the write operation on the super block with the serial number (5), then the write rate will increase when performing the write operation on the super blocks with the serial numbers (6) and (7), and then the write rate will decrease when performing the write operation on the super block with the serial number (8). In this way, the time in which the write rate is decreased will not last for a long time, which can reduce the performance fluctuation of the memory system and effectively smooth the write performance of the memory system.

In some implementations, the sorting of multiple super blocks is provided in the form of a super block list. Here, by querying the super block list, the target super block on which the write operation is to be performed can be obtained.

In other implementations, the sorting of multiple super blocks is provided in the form of a red-black tree. Here, considering that the length of the list is getting longer and longer, adjusting the list to a red-black tree can improve query efficiency and save query time.

In some implementations, a data block means that a valid data part and an invalid data part are written in the super block, and the valid data part and the invalid data part are scattered at different positions in the super block. Here, the "valid data part" and "invalid data part" are related to the content of wear leveling, instead of the "valid data" and "invalid data" in the garbage collection process mentioned above. In an example, the valid data part often includes cold data whose access frequency is low, and the invalid data part often includes hot data whose access frequency is high.

As mentioned earlier, static wear leveling means cold data are written to a super block with a large erase count. At this time, the cold data is the second target data, and the super block with a larger erase count is the second target super block. The valid transport unit count can be used to characterize the valid data portion in the super block. Considering that some super blocks are used to store system data during static wear leveling, these system data are cold data. The super blocks storing these system data belong to super blocks with a small erase count. These system data can be moved out and written into the super block with a large erase count, thereby releasing the super block that would otherwise be used to store system data, so that these super blocks with small erase counts can be fully utilized.

Still referring to FIG. 7 and FIG. 8, an implementation of the present disclosure provides a memory system 102. The memory system 102 includes at least one non-volatile storage device 104 and a controller 106 coupled to the non-volatile storage device 104. Each non-volatile storage device 104 includes multiple blocks, and at least one block in at least one non-volatile storage device 104 constitutes a super block. The above-mentioned controller 106 may be configured to determine sorting of the multiple super blocks based on an erase count of each super block and a number of bad blocks in each super block. The erase counts of any two adjacent super blocks in the sorting meet a preset requirement, first super blocks in the sorting are arranged at intervals, and a number of bad blocks in the first super block is greater than a preset value. The above-mentioned controller 106 may be configured to determine a priority of write operations on the multiple super blocks based on the sorting of the multiple super blocks.

In some implementations, the above-mentioned controller 106 may be configured to organize write operation priorities such that the higher the rank of the super block in the sorting is, the higher the priority of write operations to the super block is. The erase count of the super block that is ranked higher in any two adjacent super blocks in the sorting is less than or equal to an erase count of the super block that is ranked lower; or the erase count of the super block that is ranked higher in any two adjacent super blocks in the sorting is greater than an erase count of the super block that is ranked lower and the difference in the erase counts of the two super blocks is less than the preset difference.

In some implementations, the above-mentioned controller 106 may be configured to organize write operation priorities such that the higher the rank of the super block in the sorting is, the lower the priority of write operations to the super block is. The erase count of the super block that is ranked higher in any two adjacent super blocks in the sorting is greater than or equal to an erase count of the super block that is ranked lower: or, the erase count of the super block that is ranked higher in any two adjacent super blocks in the sorting is less than an crase count of the super block that is ranked lower and the difference in the erase counts of the two super blocks is less than the preset difference.

In some implementations, the above-mentioned controller 106 may be configured to determine a pre-sorting of the multiple super blocks based on the crase count of each super block. The multiple super blocks in the pre-sorting are sequentially arranged in an ascending order or a descending order based on the erase count.

In some implementations, the above-mentioned controller 106 may be configured to determine at least two adjacently arranged first super blocks based on the pre-sorting of the multiple super blocks. In some implementations, the above-mentioned controller 106 may be configured to adjust an order or a position of the first super block based on the number of bad blocks in the first super block to determine a first sub-sorting of the multiple super blocks. The erase counts of any two adjacent super blocks in the first sub-sorting may meet the preset requirements, and the first super blocks in the first sub-sorting may not be adjacently arranged.

In some implementations, the multiple super blocks further include a second super block and a third super block. The number of the bad blocks in the second super block is greater than zero and less than or equal to a preset value, and the number of the bad blocks in the third super block is equal to zero. In some implementations, the first super block and the second super block in the first sub-sorting may be adjacently arranged. In some implementations, the first super block and the third super block in the first sub-sorting may be adjacently arranged.

In some implementations, the above-mentioned controller 106 may be configured to determine the first super block and the second super block that are adjacently arranged based on the first sub-sorting of the multiple super blocks. In some implementations, the above-mentioned controller 106 may be configured to adjust the order or position of the first super block and the second super block based on the numbers of bad blocks in the first super block and the second super block to determine a second sub-sorting of the multiple super blocks. The erase counts of any two adjacent super blocks in the second sub-sorting may meet a preset requirement, and the first super block and the second super block in the second sub-sorting may not be adjacently arranged.

In some implementations, two second super blocks in the second sub-sorting may be adjacently arranged. In some implementations, the first super block and the third super block in the second sub-sorting may be adjacently arranged. In some implementations, the second super block and the third super block in the second sub-sorting may be adjacently arranged.

In some implementations, the above-mentioned controller 106 may be configured to determine at least two adjacently arranged second super blocks based on the second sub-sorting of the multiple super blocks. In some implementations, the above-mentioned controller 106 may be configured to adjust the order or position of the second super block based on the number of bad blocks in the second super block to determine the sorting of the multiple super blocks, wherein the second super blocks in the sorting are not adjacently arranged.

In some implementations, the second super block and the third super block in the sorting may be adjacently arranged.

In some implementations, super blocks may include free blocks.

An implementation of the present disclosure provides a computer-readable storage medium, where a computer program is stored in the computer-readable storage medium, and when the computer program is executed, the operation method for the memory system in the above technical solution can be implemented. The method may include determining sorting of multiple super blocks based on an erase count of each super block and the number of bad blocks in each super block. The erase counts of any two adjacent super blocks in the sorting meet a preset requirement, first super blocks in the sorting are arranged at intervals, and a number of bad blocks in the first super block is greater than a preset value. The method may include determining a priority of write operations on the multiple super blocks based on the sorting of the multiple super blocks.

In the implementation of the present disclosure, the computer-readable storage medium may include Random Access Memory (RAM), internal memory, Read-Only Memory (ROM), electrically programmable ROM, electrically erasable programmable ROM, register, hard disk, removable disk, CD-ROM, or any other form of program code media known in the technical field.

In the implementations of the present disclosure, the operation method for the memory system in the above technical solution may be implemented by running firmware.

An implementation of the present disclosure further provides an electronic device, which includes the memory system in the above technical solution. Here, the electronic device may include a mobile phone, a desktop computer, a tablet computer, a notebook computer, a server, an in-vehicle device, a wearable device, or a mobile power supply, and the like.

Implementations of the present disclosure provide a memory system, an operation method thereof, and a computer-readable storage medium. In the implementation of the present disclosure, both the erase count of the super block and the number of bad blocks in the super block are considered to determine the priority of the write operation to the super block. This may effectively smooth the write performance and enhance the performance stability of the memory system.

It should be understood that reference throughout the specification to "one implementation" or "an implementation" means that a particular feature, structure or characteristic related to the implementation is included in at least one implementation of the present disclosure. Thus, appearances of "in one implementation" or "in an implementation" in various places throughout the specification are not necessarily referring to the same implementation. Furthermore, the particular features, structures or characteristics may be combined in any suitable manner in one or more implementations. It should be understood that in various implementations of the present disclosure, the serial numbers of the above-mentioned processes do not mean the order of execution, and the execution order of the processes should be determined by their functions and inherent logic, rather than limiting implementation process of the implementations of the present disclosure. The serial numbers of the above-mentioned implementations of the present disclosure are for description only, and do not represent the advantages and disadvantages of the implementations.

The forgoing description is only a preferred implementation of the present disclosure, and does not limit the patent scope of the present disclosure. Under the inventive concept of the present disclosure, the equivalent structural transformation made by using the contents of descriptions and accompanying drawings of the disclosure or direct/indirect application to other relevant technical fields are encompassed in the patent protection scope of the present disclosure.

What is claimed is:

1. A memory system, comprising:
one or more non-volatile storage devices, wherein each of the one or more non-volatile storage devices comprises a plurality of blocks, and at least one block in at least one of the one or more non-volatile storage devices constitutes a super block; and
a controller coupled to the non-volatile storage device and configured to:
determine sorting of a plurality of super blocks based on an erase count of each super block and a number of bad blocks in each super block, wherein erase counts of any two adjacent super blocks in the sorting meet a preset requirement, the plurality of super blocks comprises first super blocks, second super blocks, and third super blocks, the first super blocks in the sorting are arranged at intervals, a number of bad blocks in a first super block is greater than a preset value, a number of bad blocks in a second super block is greater than zero and less than or equal to the preset value, and a number of bad blocks in a third super block is equal to zero; and
determine a priority of write operations on the plurality of super blocks based on the sorting of the plurality of super blocks.

2. The memory system of claim 1, wherein:
the higher a rank of the super block in the sorting, the higher the priority of write operations on the super block by the controller, and an erase count of a super block that is ranked higher in any two adjacent super blocks in the sorting is less than or equal to an erase count of a super block that is ranked lower, or the erase count of the super block that is ranked higher in any two adjacent super blocks in the sorting is greater than the erase count of the super block that is ranked lower, and a difference between the erase counts of two super blocks is less than a preset difference, or
the higher the rank of the super block in the sorting, the lower the priority of write operations on the super block by the controller, and the erase count of the super block that is ranked higher in any two adjacent super blocks in the sorting is greater than or equal to the erase count of the super block that is ranked lower, or the erase count of the super block that is ranked higher in any two adjacent super blocks in the sorting is less than the erase count of the super block that is ranked lower, and the difference between the erase counts of the two super blocks is less than the preset difference.

3. The memory system of claim 1, wherein the controller is further configured to:
determine a pre-sorting of the plurality of super blocks based on the erase count of each super block,
wherein the plurality of super blocks in the pre-sorting are sequentially arranged in an ascending order or a descending order based on the erase count.

4. The memory system of claim 3, wherein the controller is further configured to:
determine at least two adjacently arranged first super blocks based on the pre-sorting of the plurality of super blocks; and
adjust an order or a position of the first super block based on the number of bad blocks in the first super block to determine a first sub-sorting of the plurality of super blocks,
wherein the erase counts of any two adjacent super blocks in the first sub-sorting meet the preset requirements, and
wherein the first super blocks in the first sub-sorting are not adjacently arranged.

5. The memory system of claim 4, wherein:
the first super block and the second super block in the first sub-sorting are adjacently arranged, or the first super block and the third super block in the first sub-sorting are adjacently arranged.

6. The memory system of claim 5, wherein the controller is further configured to:
determine the first super block and the second super block that are adjacently arranged based on the first sub-sorting of the plurality of super blocks; and
adjust the order or position of the first super block and the second super block based on the numbers of bad blocks in the first super block and the second super block to determine a second sub-sorting of the plurality of super blocks, wherein the erase counts of any two adjacent super blocks in the second sub-sorting meet a preset requirement, and wherein the first super block and the second super block in the second sub-sorting are not adjacently arranged.

7. The memory system of claim 6, wherein:

two second super blocks in the second sub-sorting are adjacently arranged, the first super block and the third super block in the second sub-sorting are adjacently arranged, or the second super block and the third super block in the second sub-sorting are adjacently arranged.

8. The memory system of claim 7, wherein the controller is further configured to:

determine at least two adjacently arranged second super blocks based on the second sub-sorting of the plurality of super blocks; and adjust an order or a position of the second super block based on the number of bad blocks in the second super block to determine the sorting of the plurality of super blocks, wherein the second super blocks in the sorting are not adjacently arranged.

9. The memory system of claim 8, wherein the second super block and the third super block in the sorting are adjacently arranged.

10. The memory system of claim 1, wherein the super block comprises a free block.

11. A method of operating a memory system, the memory system comprising one or more non-volatile storage devices and a controller coupled to the non-volatile storage device, each of the one or more non-volatile storage devices comprising a plurality of blocks, and at least one block in at least one of the one or more non-volatile storage devices constituting a super block, the method comprising:

determining, by the controller, sorting of a plurality of super blocks based on an erase count of each super block and a number of bad blocks in each super block, wherein erase counts of any two adjacent super blocks in the sorting meet a preset requirement, the plurality of super blocks comprises first super blocks, second super blocks, and third super blocks, the first super blocks in the sorting are arranged at intervals, a number of bad blocks in a first super block is greater than a preset value, a number of bad blocks in a second super block is greater than zero and less than or equal to the preset value, and a number of bad blocks in a third super block is equal to zero; and determining, by the controller a priority of write operations on the plurality of super blocks based on the sorting of the plurality of super blocks.

12. The method of claim 11, wherein:

the higher a rank of the super block in the sorting, the higher the priority of write operations on the super block by the controller, and an erase count of a super block that is ranked higher in any two adjacent super blocks in the sorting is less than or equal to an erase count of a super block that is ranked lower, or the erase count of the super block that is ranked higher in any two adjacent super blocks in the sorting is greater than the erase count of the super block that is ranked lower, and a difference between the erase counts of two super blocks is less than a preset difference, or the higher the rank of the super block in the sorting, the lower the priority of write operations on the super block by the controller, and the erase count of the super block that is ranked higher in any two adjacent super blocks in the sorting is greater than or equal to the erase count of the super block that is ranked lower, or the erase count of the super block that is ranked higher in any two adjacent super blocks in the sorting is less than the erase count of the super block that is ranked lower, and the difference between the erase counts of the two super blocks is less than the preset difference.

13. The method of claim 11, before the determining sorting of a plurality of super blocks based on an erase count of each super block and a number of bad blocks in each super block, the method further comprises:

determining a pre-sorting of the plurality of super blocks based on the erase count of each super block, wherein the plurality of super blocks in the pre-sorting are sequentially arranged in an ascending order or a descending order based on the erase count.

14. The method of claim 13, after the determining a pre-sorting of the plurality of super blocks based on the erase count of each super block, the method further comprises:

determining at least two adjacently arranged first super blocks based on the pre-sorting of the plurality of super blocks; and adjusting an order or a position of the first super block based on the number of bad blocks in the first super block to determine a first sub-sorting of the plurality of super blocks, wherein the erase counts of any two adjacent super blocks in the first sub-sorting meet the preset requirements, and wherein the first super blocks in the first sub-sorting are not adjacently arranged.

15. The method of claim 14, wherein:

the first super block and the second super block in the first sub-sorting are adjacently arranged, or the first super block and the third super block in the first sub-sorting are adjacently arranged.

16. The method of claim 15, where after adjusting an order or a position of the first super block based on the number of bad blocks in the first super block to determine a first sub-sorting of the plurality of super blocks, the method further comprises:

determining the first super block and the second super block that are adjacently arranged based on the first sub-sorting of the plurality of super blocks; and adjusting the order or position of the first super block and the second super block based on the numbers of bad blocks in the first super block and the second super block to determine a second sub-sorting of the plurality of super blocks, wherein the erase counts of any two adjacent super blocks in the second sub-sorting meet a preset requirement, and wherein the first super block and the second super block in the second sub-sorting are not adjacently arranged.

17. The method of claim 16, wherein:

two second super blocks in the second sub-sorting are adjacently arranged, the first super block and the third super block in the second sub-sorting are adjacently arranged, or the second super block and the third super block in the second sub-sorting are adjacently arranged.

18. The method of claim 17, wherein after adjusting the order or position of the first super block and the second super block based on the numbers of bad blocks in the first super block and the second super block to determine a second sub-sorting of the plurality of super blocks, the method further comprises:

determining at least two adjacently arranged second super blocks based on the second sub-sorting of the plurality of super blocks; and adjusting an order or a position of the second super block based on the number of bad blocks in the second super block to determine the sorting of the plurality of super blocks, wherein the second super blocks in the sorting are not adjacently arranged.

19. The method of claim 18, wherein the second super block and the third super block in the sorting are adjacently arranged.

20. A computer-readable storage medium having a computer program stored thereon, the computer program, when executed, implements a method of operating a memory system, the memory system comprising-at least one or more non-volatile storage device and a controller coupled to the one or more non-volatile storage device, each of the one or more non-volatile storage devices comprising a plurality of blocks, and at least one block in at least one of the one or more non-volatile storage devices constituting a super block, the method comprising:

determining sorting of a plurality of super blocks based on an erase count of each super block and a number of bad blocks in each super block, wherein erase counts of any two adjacent super blocks in the sorting meet a preset requirement, the plurality of super blocks comprises first super blocks, the first super blocks in the sorting are arranged at intervals, a number of bad blocks in a first super block is greater than a preset value, a number of bad blocks in a second super block is greater than zero and less than or equal to the preset value, and a number of bad blocks in a third super block is equal to zero; and determining a priority of write operations on the plurality of super blocks based on the sorting of the plurality of super blocks.

* * * * *